(12) United States Patent
Tsukamoto et al.

(10) Patent No.: US 9,778,361 B2
(45) Date of Patent: Oct. 3, 2017

(54) DISTANCE MEASURING METHOD AND DISTANCE MEASURING SYSTEM

(71) Applicant: Panasonic Intellectual Property Management Co., Ltd., Osaka (JP)

(72) Inventors: Akira Tsukamoto, Osaka (JP); Hirokazu Shiraki, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 175 days.

(21) Appl. No.: 14/789,184

(22) Filed: Jul. 1, 2015

(65) Prior Publication Data

US 2015/0301177 A1   Oct. 22, 2015

Related U.S. Application Data

(63) Continuation of application No. PCT/JP2014/000242, filed on Jan. 20, 2014.

(30) Foreign Application Priority Data

Jan. 31, 2013  (JP) .................. 2013-016630

(51) Int. Cl.
*G01S 17/10* (2006.01)
*G01S 7/484* (2006.01)
(Continued)

(52) U.S. Cl.
CPC .............. *G01S 17/10* (2013.01); *G01S 7/484* (2013.01); *G01S 7/489* (2013.01); *G01S 7/4863* (2013.01);
(Continued)

(58) Field of Classification Search
CPC .......... G01C 11/025; G02B 7/32; G01S 17/08; G01S 17/89; G01S 7/4802; G01S 7/4812;
(Continued)

(56) References Cited

U.S. PATENT DOCUMENTS 6,057,909 A * 5/2000 Yahav .................. G01C 11/025
                                                        313/103 CM
2005/0269481 A1   12/2005 David et al.
2007/0097349 A1   5/2007 Wada et al.

FOREIGN PATENT DOCUMENTS

JP    03-035113 A    2/1991
JP    2007-121116 A  5/2007

OTHER PUBLICATIONS

Internaional Search Report issued in PCT/JP2014/000242, dated Mar. 4, 2014, with English translation.

* cited by examiner

*Primary Examiner* — Luke Ratcliffe
(74) *Attorney, Agent, or Firm* — McDermott Will & Emery LLP

(57) ABSTRACT

In a TOF distance measurement employing light, the accuracy of distance measurement is improved without a significant increase in cost. A light source emits light to an object during an emission period. A sensor converts received reflected light (delay time τ) into an electrical signal during a plurality of signal accumulation periods, and accommodates the electrical signal. The signal accumulation period is set so that an accumulated signal amount varies depending on a distance to the object. The emission intensity of the light source is changed during the emission period so that the accumulated signal amount and the distance to the object has a nonlinear relationship.

17 Claims, 20 Drawing Sheets

(51) Int. Cl.
*G01S 17/89* (2006.01)
*G01S 7/486* (2006.01)
*G01S 7/489* (2006.01)

(52) U.S. Cl.
CPC .......... *G01S 7/4865* (2013.01); *G01S 7/4868* (2013.01); *G01S 17/89* (2013.01)

(58) Field of Classification Search
CPC .......... G01S 7/4817; G01S 7/51; G01S 15/89; G01S 17/107; G01S 17/88; G01S 17/933; G01S 17/936; G01S 17/02
See application file for complete search history.

EMISSION INTENSITY
IE1

INTENSITY OF
REFLECTED LIGHT
IR1

$S_1$ SIGNAL
ACCUMULATION TIMING $S_0$ SIGNAL
ACCUMULATION TIMING $\tau$

0   $T_0$   $2T_0$   → TIME

DISTANCE $D/D_0$

SIGNAL AMOUNT $S_1/S_0$

DISTANCE MEASURING METHOD AND DISTANCE MEASURING SYSTEM

CROSS-REFERENCE TO RELATED APPLICATIONS

This is a continuation of International Application No. PCT/JP2014/000242 filed on Jan. 20, 2014, which claims priority to Japanese Patent Application No. 2013-016630 filed on Jan. 31, 2013. The entire disclosures of these applications are incorporated by reference herein.

BACKGROUND

The present disclosure relates to time-of-flight (TOF) distance measuring systems.

Techniques of measuring a distance to an object are roughly divided into two types. A first-type technique, which may also be called a direct technique, is performed using a ruler, measuring tape, etc. Although the accuracy of the scale of a ruler, etc., directly determines the accuracy of distance measurement, the ruler needs to reach an object. A second-type technique, which may also be called an indirect technique, is commonly performed using trigonometry. This is significantly different from the direct technique in that distance measurement can be achieved without touching an object. The technique utilizing a laser pattern illumination and an image sensor, which has in recent years been applied to game devices, and the 3D imaging technique utilizing two cameras, are considered to be a kind of trigonometric indirect technique.

Time-of-flight (TOF) is another technique of measuring a distance to an object. Specifically, acoustic wave or light is emitted toward an object, a phase difference between a reflected signal and a sound source or light source is detected using a sensor that operates in synchronization with the sound source or light source, and a distance to the object is calculated from the phase difference based on the speed of acoustic wave or light. The TOF technique is considered to be the first type technique, i.e., a kind of direct technique, and also has the advantage of the indirect technique that a distance to a distant object can be measured without physically touching the object.

Japanese Unexamined Patent Publication No. 2007-121116 describes a TOF distance measuring technique using a light source and an image sensor in combination. A TOF distance measuring system employing light includes a light source and a sensor that operates in synchronization with the light source.

SUMMARY

FIG. 26 is a timing chart showing an example waveform of light emitted by a light source, an example waveform of reflected light, and example timings of signal accumulation by a sensor, in Japanese Unexamined Patent Publication No. 2007-121116. In Japanese Unexamined Patent Publication No. 2007-121116, the waveform of the emitted light is rectangular. In FIG. 26, the light source emits light during an emission period of $0\text{-}T_0$, and the sensor receives the reflected light, converts the received reflected light into an electrical signal, and accumulates the electrical signal. The waveform of the reflected light is delayed from the waveform of the emitted light by a time $\tau$.

The waveform of the emitted light may be represented by:

$$I = 1 (0 \leq t \leq T_0)$$

$$I = 0 (t \leq 0, T_0 \leq t) \quad (1)$$

where the amplitude of the waveform of the emitted light is normalized to one for the sake of simplicity.

The waveform of the reflected light may be represented by:

$$I' = r (\tau \leq t \leq T_0 + \tau)$$

$$I' = 0 (t \leq \tau, T_0 + \tau \leq t) \quad (2)$$

where r represents an attenuation rate due to reflection or diffusion of light.

The sensor accumulates signal amounts $S_0$ and $S_1$ obtained by converting the reflected light into an electrical signal during respective accumulation periods having different end times. The accumulation periods of the signal amounts $S_0$ and $S_1$ are represented, respectively, by:

$$S_0: 0 \leq t \leq 2T_0$$

$$S_1: 0 \leq t \leq T_0 \quad (3)$$

In this case, the signal amounts $S_0$ and $S_1$ accumulated by the sensor are represented by:

$$S_0 = rT_0$$

$$S_1 = r(T_0 - \tau) \quad (4)$$

By observing these amounts, the delay $\tau$ due to reflection of the emitted light by an object may be calculated by:

$$\tau = \left(1 - \frac{S_1}{S_0}\right) T_0 \quad (5)$$

Therefore, if the light source and the sensor are located at approximately the same position, a distance D to an object (hereinafter also referred to as the "object distance D") is calculated from the detected signal amounts $S_0$ and $S_1$ by:

$$D = \frac{c\tau}{2} = \frac{T_0}{2}\left(1 - \frac{S_1}{S_0}\right) \quad (6)$$

where $T_0$ represents the pulse width of the emitted light, and c represents the speed of light.

Here, if the delay $\tau$ has the following value when the pulse width is $T_0$:

$$T_0 \leq \tau \quad (7)$$

then the following is invariably established:

$$S_1 = 0 \quad (8)$$

Therefore, the object distance D cannot be calculated. Specifically, the limit $D_0$ (hereinafter also referred to as a "distance measurement range") of distance measurement using the emitted light having the pulse width $T_0$ is represented by:

$$D_0 = \frac{cT_0}{2} \quad (9)$$

The object distance D may be represented using the distance measurement range $D_0$ by:

$$D = D_0\left(1 - \frac{S_1}{S_0}\right) \quad (10)$$

When an area image sensor is used for the detection, signal amounts $S_0(x, y)$ and $S_1(x, y)$ corresponding to coordinates $(x, y)$ of each pixel may be measured, and an object distance $D(x, y)$ corresponding to each pixel may be calculated by:

$$D(x, y) = \frac{cT_0}{2}\left(1 - \frac{S_1(x, y)}{S_0(x, y)}\right) \quad (11)$$

Here, from the waveform of emitted light represented by Expression 1 and the timings of signal accumulation represented by Expression 3, it is obvious that $S_0$ is constant independently of the distance of an object to be measured. Specifically, a relationship between $S_1/S_0$ and $D/D_0$ represents a relationship between the distance of an object to be measured and the accumulated signal amount.

FIG. 27 is a graph plotted based on Expression 10 to show the relationship between $S_1/S_0$ and $D/D_0$. As can be seen from FIG. 27, the proportion of a change in $D/D_0$ to a change in $S_1/S_0$ is invariably −1 independently of the distance of an object to be measured.

Incidentally, when TOF distance measurement employing light is performed, an actual measurement error caused by an error in the accumulated signal amount is unavoidable. Here, an error $e(S_1)$ in the signal amount $S_1$ and an error $e(D)$ in the distance D have a relationship represented based on a relationship between D and $S_1$ by:

$$e(D) = \frac{dD}{dS_1}e(S_1) = -\frac{D_0}{S_1}e(S_1) \quad (12)$$

Specifically, if the ratio of an error to the signal amount $S_1$ is 1/100, the ratio of an error to the measured distance D is also 1/100. An error in the signal amount $S_1$ is caused by variations in the measured signal amount, the resolution of the measured value, etc. The resolution of the measured value mainly depends on the resolution of conversion of a signal amount into a digital value.

Also, in TOF distance measurement employing light, a sensor is used to measure the amount of reflected light. Therefore, shot noise unavoidably occurs because light has quantum properties. Shot noise is represented by the square root of a signal amount. Specifically, the ratio of shot noise to a signal is represented by:

$$\frac{\sqrt{S_1}}{S_1} = \frac{1}{\sqrt{S_1}} \quad (13)$$

In other words, according to Expressions 12 and 13, as the signal amount $S_1$ increases, variations in distance measurement decrease. Table 1 shows data obtained by calculating the ratio of shot noise to a signal amount (the number of signal electrons).

TABLE 1

| Relationship between Signal Amount (Number of Signal Electrons) and Shot Noise | | |
|---|---|---|
| Signal amount $S_1$ | Shot noise | Ratio |
| 100 | 10 | 0.1 |
| 1,000 | 32 | 0.03 |
| 10,000 | 100 | 0.01 |
| 100,000 | 316 | 0.031 |
| 1,000,000 | 1,000 | 0.001 |

As can be seen from Table 1, a typical image sensor, which can handle a signal amount of about 10,000-20,000 signal electrons, has an error corresponding to a ratio of about 0.01. On the other hand, commonly used 10-bit digital conversion has a resolution of 1/1024, and therefore, has a ratio of about 0.001. Therefore, in a typical signal amount range of not more than several ten thousands to several hundred thousands of signal electrons, the error may be mainly caused by measurement variations due to shot noise.

In theory, to increase the signal amount of light is the only way to reduce shot noise. For example, in order to reduce the ratio of shot noise to a signal by a factor of two, it is necessary to increase the signal amount by a factor of four. However, in the case of an image sensor, in which the cell performance is proportional to the cell area, this cannot be achieved without a significant sacrifice such as that the number of pixels is reduced by a factor of four and the cell area is increased by a factor of four, that the length and width of each of the cell size and chip size are both increased by a factor of two while maintaining the number of pixels, etc. The signal amount may be increased by increasing the intensity of a light source. Note that, in order to increase the signal amount by a factor of four, it is necessary to increase the power by a factor of four, which is practically difficult to achieve. Even if possible, a significant increase in cost is unavoidable, for example.

The present disclosure describes implementations of a TOF distance measuring method and distance measuring system employing light that improve the accuracy of distance measurement without a significant increase in cost.

According to an embodiment of the present disclosure, in a time-of-flight (TOF) distance measuring system including a light source for emitting light, a sensor for operating in synchronization with the light source to convert received reflected light into an electrical signal and accumulate the electrical signal, and a calculation device, a method for measuring a distance to an object includes emitting light to the object during a predetermined emission period using the light source, accumulating signal amounts during a plurality of signal accumulation periods different from each other in at least one of a start time and an end time in the sensor, and calculating the distance to the object based on the signal amounts accumulated in the plurality of signal accumulation periods using the calculation device. A first signal accumulation period that is at least one of the plurality of signal accumulation periods is set so that a first accumulated signal amount that is a signal amount accumulated during the first signal accumulation period varies depending on the distance to the object. Emission intensity of the light source during the emission period is changed so that the first accumulated signal amount and the distance to the object have a nonlinear relationship within a distance measurement range.

According to the embodiment, the first accumulated signal amount accumulated during the first signal accumulation period varies depending on the distance to the object. The emission intensity of the light source during the emission period is changed so that the first accumulated signal amount and the distance to the object has a nonlinear relationship. Therefore, the proportion of a change in the distance to the object to a change in the accumulated signal amount can be caused to be smaller in the vicinity of a predetermined distance within the distance measurement range than in the other portion of the distance measurement range. Therefore, the accuracy of distance measurement is improved in the vicinity of the predetermined distance.

According to the present disclosure, the accuracy of distance measurement can be improved in the vicinity of a predetermined distance.

DETAILED DESCRIPTION

A TOF distance measuring method and distance measuring system according to embodiments will now be described with reference to the accompanying drawings.

(First Embodiment): Improvement in Accuracy of Long Distance

Figure 1:
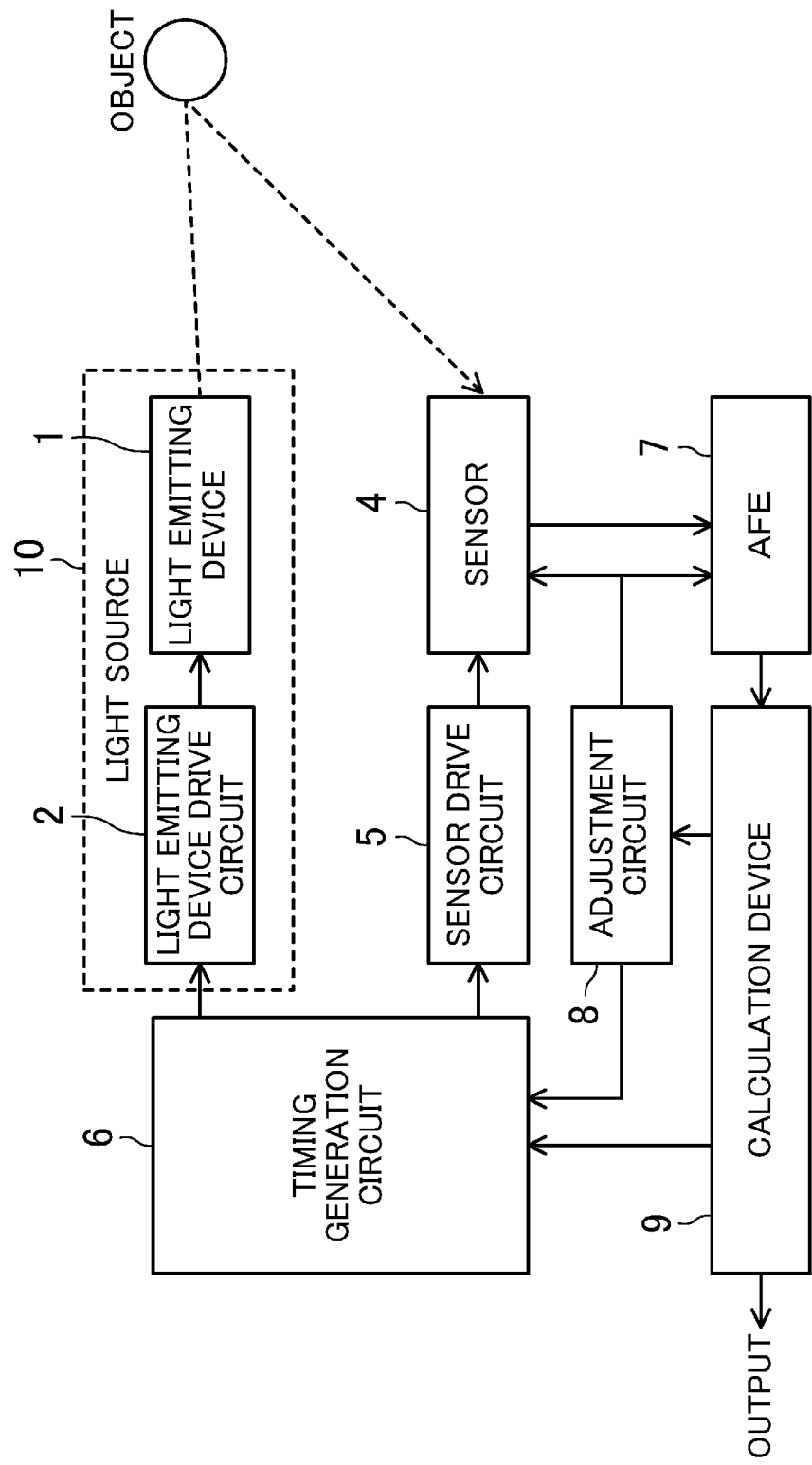
FIG. 1 is a block diagram showing an example configuration of a TOF distance measuring system according to a first to a third embodiment.
Figure 2:
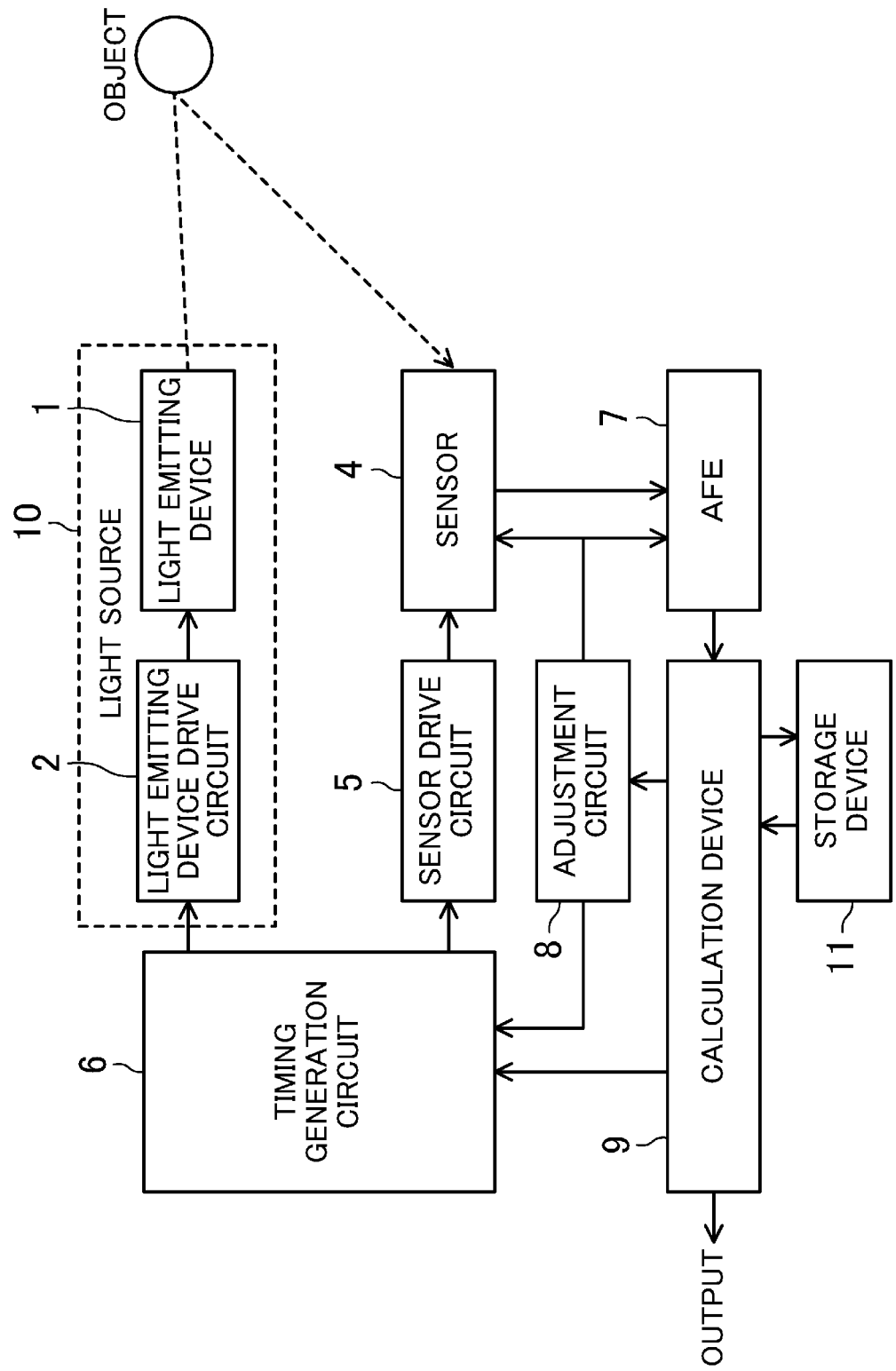
FIG. 2 is a block diagram showing another example configuration of a TOF distance measuring system according to the first to third embodiments.

FIGS. 1 and 2 are block diagrams showing an example configuration of a TOF distance measuring system according to a first embodiment. In FIGS. 1 and 2, a light source 10 that emits light includes a light emitting device 1 and a light emitting device drive circuit 2 that drives the light emitting device 1 to emit light. The light source 10 emits light once or intermittently. A sensor 4 converts received reflected light into an electrical signal, and accumulates the electrical signal. A sensor drive circuit 5 drives the sensor 4 to accumulate a signal amount. A timing generation circuit 6 sends a drive timing signal to the light emitting device drive circuit 2 and the sensor drive circuit 5 to synchronize the light emission operation of the light source 10 with the signal accumulation operation of the sensor 4.

An analog front end (AFE) 7 converts an output of the sensor 4 into a digital signal. A calculation device 9 calculates a distance to an object using an output of the AFE 7. Here, if the sensor 4 includes an AD conversion device, the AFE 7 is not required. An adjustment circuit 8 adjusts, based on information output from the calculation device 9, a difference in drive timing between the light emitting device 1 and the sensor 4, the gain of an output of the sensor 4, etc. Note that the adjustment circuit 8 is provided in order to maintain the system in an optimum state, and therefore, is not essential. Also, a power supply device is additionally required, which is not shown because it is obvious. Note that the functions of the light emitting device drive circuit 2, the sensor drive circuit 5, the timing generation circuit 6, the AFE 7, the adjustment circuit 8, and the calculation device 9 may be integrated into a smaller number of ICs. All or a portion of the light emitting device drive circuit 2, the sensor drive circuit 5, the timing generation circuit 6, the AFE 7, the adjustment circuit 8, and the calculation device 9 may be mounted on the same chip on which the sensor 4 is mounted.

In the configuration of FIG. 1, the calculation device 9 stores a calculation expression or lookup table indicating a relationship between a distance to an object and a sensor output. The calculation device 9 calculates a distance from the output of the sensor 4 using the calculation expression. In the configuration of FIG. 2, a storage device 11 is provided that stores the lookup table indicating a relationship between a distance to an object and a sensor output. The calculation device 9 calculates a distance by referencing the lookup table stored in the storage device 11.

In this embodiment, the light source 10 emits light having a non-uniform waveform that has a peak intensity during an initial emission period, instead of a rectangular wave pulse, in order to improve the accuracy of distance measurement for a long distance close to the upper limit of a distance measurement range. Specifically, the emission intensity of the light source 10 is set to be higher during an initial portion of the emission period than during the other portion of the emission period.

Here, as an example, it is assumed that the waveform of emitted light whose emission intensity is represented by a linear function is employed.

Figure 3:
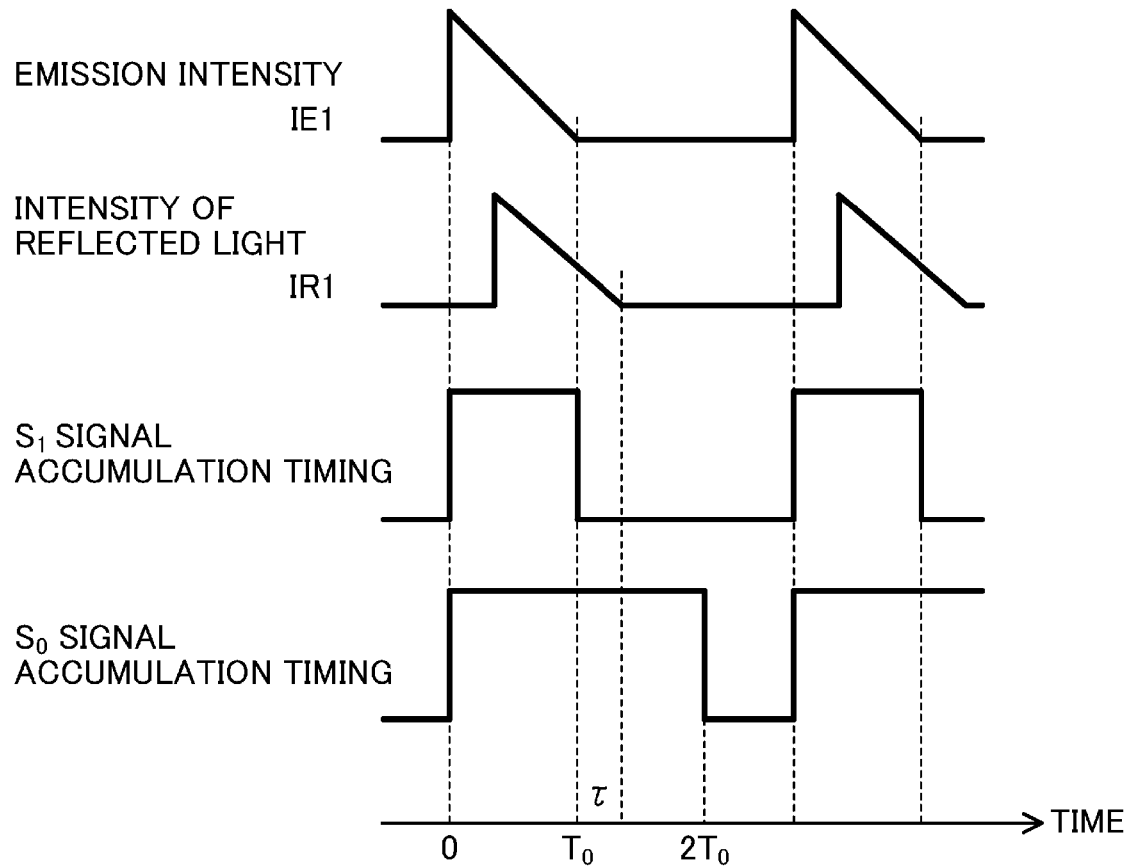
FIG. 3 is a timing chart showing an example waveform of light emitted by a light source, an example waveform of reflected light, and example timings of signal accumulation by a sensor, in the first embodiment.

FIG. 3 is a timing chart showing an example waveform of light emitted by the light source 10, an example waveform of reflected light, and example timings of signal accumulation by the sensor 4, according to this embodiment. In FIG. 3, the light source 10 emits light during an emission period of $0$-$T_0$, and the sensor 4 receives the reflected light. The waveform IR1 of the reflected light is delayed from the waveform IE1 of the emitted light by a time $\tau$.

The waveform IE1 of the emitted light may be represented by:

$$I = 1 - \frac{t}{T_0} (0 \leq t \leq T_0) \quad (14)$$

$$I = 0 (t \leq 0, T_0 \leq t)$$

where the amplitude of the waveform IE1 of the emitted light is normalized to one for the sake of simplicity.

The waveform IR1 of the reflected light may be represented by:

$$I' = r\left(1 - \frac{t-\tau}{T_0}\right)(\tau \leq t \leq T_0 + \tau) \quad (15)$$

$$I' = 0 (t \leq \tau, T_0 + \tau \leq t)$$

where r represents an attenuation rate due to reflection or diffusion of light.

The sensor 4 accumulates a plurality of signal amounts obtained by converting the reflected light into an electrical signal during respective accumulation periods that are different from each other in at least one of the start time and the end time. In the example of FIG. 3, the accumulation periods of signal amounts $S_0$ and $S_1$ are represented, respectively, by:

$S_0$: $0 \leq t \leq 2T_0$ $S_1$: $0 \leq t \leq T_0$ \quad (16)

In this case, the signal amounts $S_0$ and $S_1$ accumulated by the sensor 4 are represented by:

$$S_0 = \frac{rT_0}{2} \quad (17)$$

$$S_1 = r\left(\frac{T_0^2 - \tau^2}{2T_0}\right)$$

Accordingly, the delay $\tau$ due to reflection of the emitted light may be calculated by:

$$\tau = T_0 \sqrt{1 - \frac{S_1}{S_0}} \quad (18)$$

Therefore, if the light source 10 and the sensor 4 are located at approximately the same position, a distance D to an object is calculated from the detected signal amounts $S_0$ and $S_1$ by:

$$D = \frac{c\tau}{2} = \frac{cT_0}{2}\sqrt{1 - \frac{S_1}{S_0}} \quad (19)$$

where $T_0$ represents the pulse width of the emitted light, and c represents the speed of light.

In the above expression, the distance D and the signal amount $S_1/S_0$ have a nonlinear relationship. From the signal accumulation periods represented by Expression 16, the following is obtained:

$0 \leq S_1 \leq S_0$ \quad (20)

Therefore, a distance measurement range $D_0$ determined by light having the pulse width $T_0$ is represented by:

$$D_0 = \frac{cT_0}{2} \quad (21)$$

Therefore, Expression 19 may also be represented by:

$$D = D_0 \sqrt{1 - \frac{S_1}{S_0}} \quad (22)$$

When an image sensor is used for the detection, signal amounts $S_0(x, y)$ and $S_1(x, y)$ corresponding to coordinates (x, y) of each pixel may be measured, and an object distance $D(x, y)$ corresponding to each pixel may be calculated, as in Expression 19, by:

$$D(x, y) = \frac{cT_0}{2}\sqrt{1 - \frac{S_1(x, y)}{S_0(x, y)}} = D_0\sqrt{1 - \frac{S_1(x, y)}{S_0(x, y)}} \quad (23)$$

Here, from the waveform of emitted light represented by Expression 14 and the timings of signal accumulation represented by Expression 16, it is obvious that the signal amount $S_0$ is constant independently of the distance to an object to be measured. Specifically, a relationship between $S_1/S_0$ and $D/D_0$ represents a relationship between the distance to an object to be measured and the accumulated signal amount.

Figure 4:
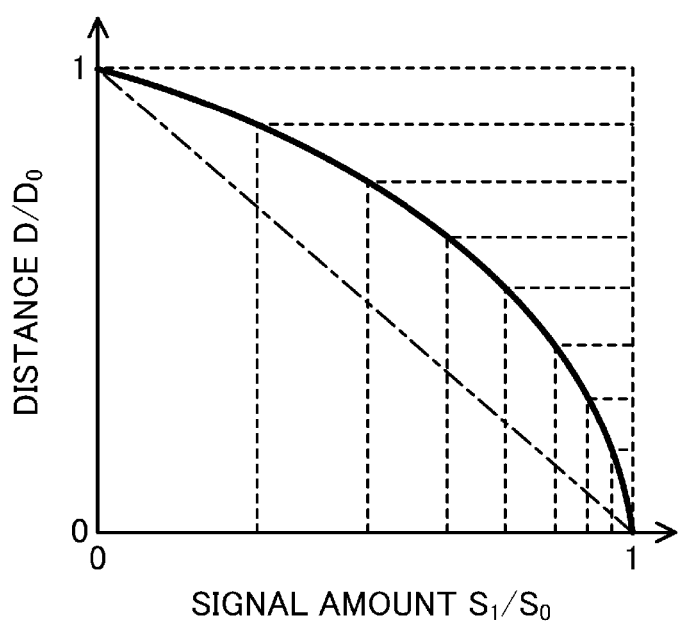
FIG. 4 is a graph showing a relationship between a distance to an object to be measured and a signal amount, that corresponds to FIG. 3.

FIG. 4 is a graph plotted based on Expression 22 to show the relationship between $S_1/S_0$ and $D/D_0$. In FIG. 4, the vicinity of $S_1/S_0=0$ corresponds to the vicinity of $D/D_0=1$, i.e., a long distance in the vicinity of the upper limit of the distance measurement range. Moreover, in the vicinity of $D/D_0=1$, the proportion of a change in $D/D_0$ to a change in $S_1/S_0$ is −1/2, and the absolute value is 1/2 compared to the conventional change proportion of −1. This means that even if the measurement accuracy of the signal amount $S_1$ of the sensor, which is an observed amount, is the same as the conventional one, the distance measurement accuracy is twice as high as the conventional one.

In other words, the proportion of a change in the distance D to a change in the signal amount $S_1$ is smaller in the vicinity of the upper limit of the distance measurement range than in the other portion of the distance measurement range. This improves the distance measurement accuracy in the vicinity of the upper limit of the distance measurement range.

The accuracy of measurement of a signal amount will now be described in greater detail. As described above, shot noise of a signal amount is dominant in the signal amount measurement accuracy. As the signal amount increases, the signal amount is less affected by shot noise. However, in FIG. 4, the variation in the distance D due to an error in the signal amount $S_1$ is smallest when the signal amount $S_1$ is in the vicinity of 0, i.e., when the shot noise of the signal amount $S_1$ is largest. Therefore, the relationship of FIG. 4 is not necessarily preferable in terms of the signal amount measurement accuracy.

Figure 5:
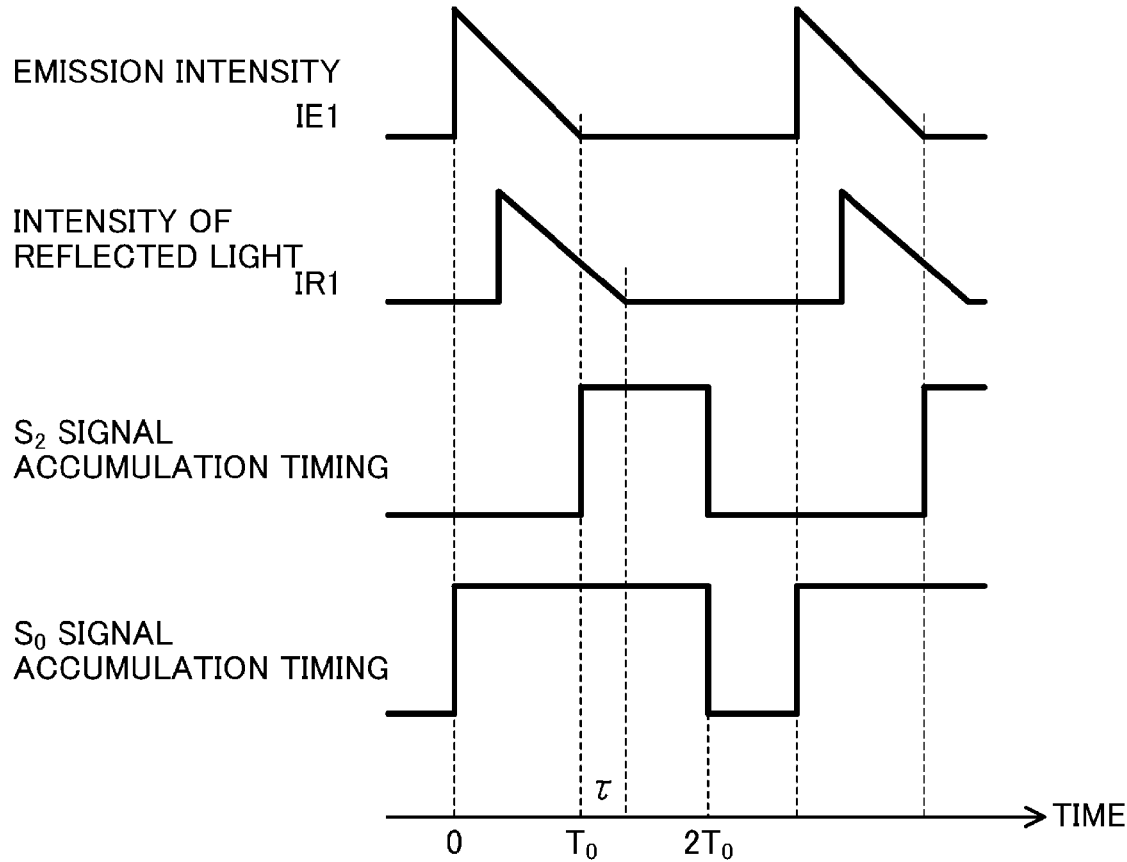
FIG. 5 is a timing chart showing another example waveform of light emitted by a light source, another example waveform of reflected light, and another example set of timings of signal accumulation by a sensor, in the first embodiment.

FIG. 5 is a timing chart showing another example waveform of light emitted by the light source 10, another example waveform of reflected light, and another example set of timings of signal accumulation by the sensor 4, according to this embodiment. In FIG. 5, instead of the signal amount $S_1$, a signal amount $S_2$ is obtained that corresponds to an accumulation period represented by:

$S_0$: $0 \leq t \leq 2T_0$ $S_2$: $T_0 \leq t \leq 2T_0$ \quad (24)

Obviously, the signal amount $S_2$ and the above signal amount $S_1$ have a relationship represented by:

$$S_2 = S_0 - S_1 \quad (25)$$

Therefore, the signal amount $S_2$ and the distance D has a relationship that is a counterpart of Expression 22, represented by:

$$D = D_0\sqrt{\frac{S_2}{S_0}} \quad (26)$$

Figure 6:
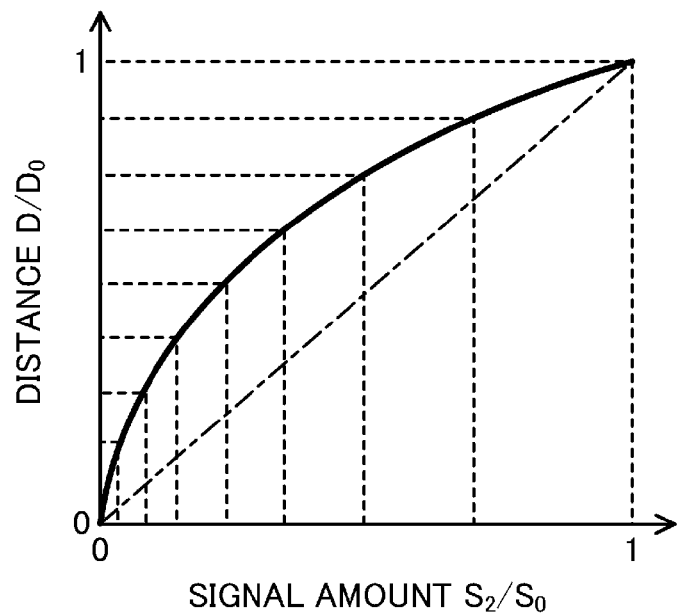
FIG. 6 is a graph showing a relationship between a distance to an object to be measured and a signal amount, that corresponds to FIG. 5.

FIG. 6 is a graph plotted based on Expression 26 to show the relationship between $S_2/S_0$ and $D/D_0$. In FIG. 6, the vicinity of $S_2/S_0=1$ corresponds to the vicinity of $D/D_0=1$, i.e., a long distance in the vicinity of the upper limit of the distance measurement range. Moreover, in the vicinity of $D/D_0=1$, the proportion of a change in $D/D_0$ to a change in $S_2/S_0$ is 1/2, and the absolute value is 1/2 compared to the conventional change proportion of −1. This means that even if the measurement accuracy of the signal amount $S_2$ of the sensor, which is an observed amount, is the same as the conventional one, the distance measurement accuracy is twice as high as the conventional one. This is similar to the case of the above signal amount $S_1$.

Moreover, in FIG. 6, the variation in the distance D due to an error in the signal amount $S_2$ is smallest when the signal amount $S_2$ is in the vicinity of the largest value ($S_2/S_0$ is in the vicinity of 1), i.e., when the shot noise of the signal amount $S_2$ is smallest. Therefore, this improvement in the signal amount measurement accuracy contributes to an improvement in the distance measurement accuracy, and therefore, the improvement in the distance measurement accuracy is further increased.

Thus, when importance is put on the distance measurement accuracy for a long distance as in this embodiment, it may be preferable that, as with the signal amount $S_2$ of FIG. 5, the signal accumulation period be set so that a larger signal amount is accumulated as the delay τ due to reflected wave increases.

Thus, according to this embodiment, if the emission intensity of the light source 10 is set to be higher during an initial portion of the emission period than during the other portion of the emission period, the proportion of a change in the distance to an object to be measured to a change in the accumulated signal amount of the sensor 4 is smaller in the vicinity of the upper limit of the distance measurement range than in the other portion of the distance measurement range. As a result, the distance measurement accuracy in the vicinity of the upper limit of the distance measurement range can be improved. Also, if the signal accumulation period is set so that the accumulated signal amount is largest when an object to be measured is in the vicinity of the upper limit of the distance measurement range, shot noise can be reduced in the vicinity of the upper limit of the distance measurement range. As a result, the distance measurement accuracy in the vicinity of the upper limit of the distance measurement range can be further improved.

Although the signal accumulation periods of the sensor 4 are assumed above to be those shown in FIG. 3 and Expression 16 or FIG. 5 and Expression 24, the present disclosure is not limited to this. For example, the accumulation period of the signal amount $S_0$ may be longer or shorter than $2T_0$. The accumulation period of the signal amount $S_1$ may be longer or shorter than $T_0$, and the start time may not be the same as that of the accumulation period of the signal amount $S_0$. The accumulation period of the signal amount $S_2$ may be longer or shorter than $T_0$, and the end time may not be the same as that of the accumulation period of the signal amount $S_0$. In addition, for example, the signal amounts $S_1$ and $S_2$ may be measured, and the signal amount $S_0$ may be calculated from Expression 25. Specifically, a plurality of signal accumulation periods that are different from each other in at least one of the start time and the end time may be provided, and a distance to an object may be calculated using a plurality of signal amounts accumulated during these signal accumulation periods.

Figure 7:
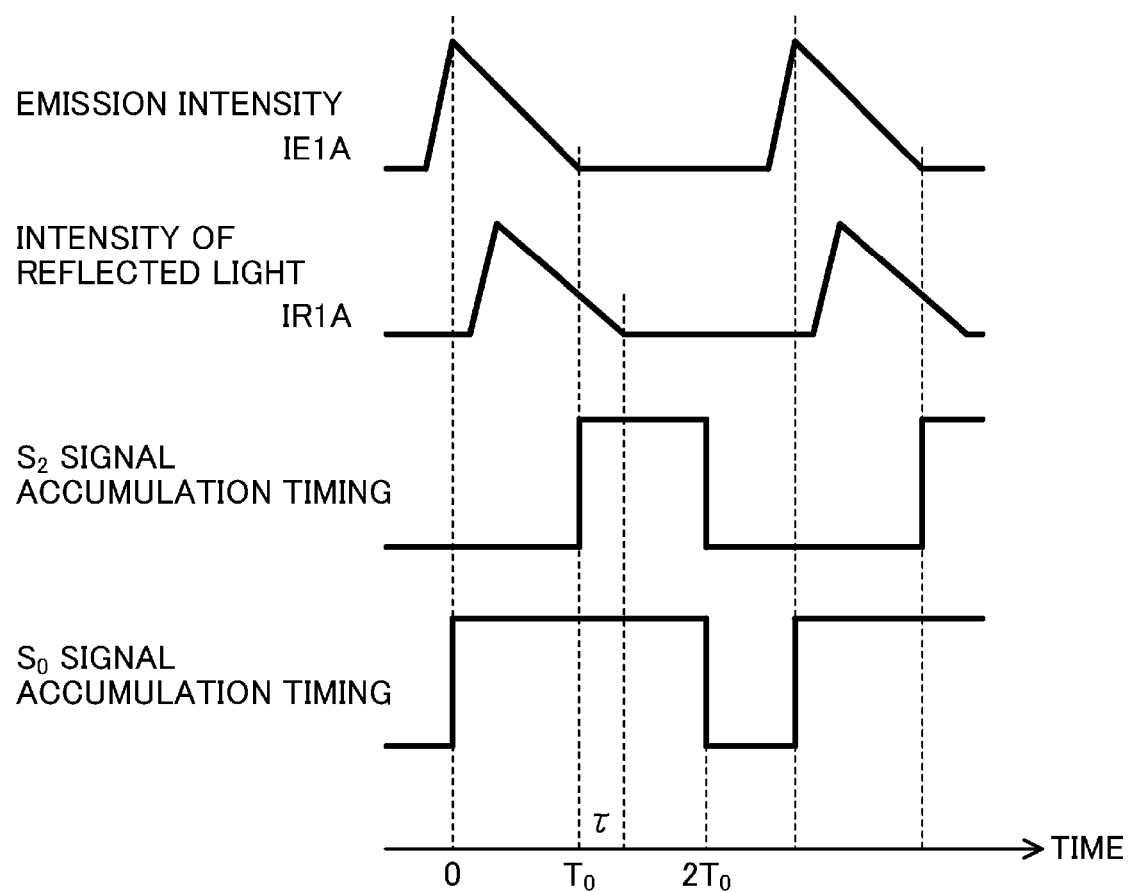
FIG. 7 is a diagram showing another example waveform of light emitted by a light source in the first embodiment.

Although the emission intensity of the light source 10 is assumed above to be zero during the period other than the signal accumulation period, the present disclosure is not limited to this. The relative relationship between the waveform of light emitted by the light source 10 and the signal accumulation by the sensor 4 is critically important. For example, it is obvious that if it is practically difficult to produce the waveform of emitted light that is represented by Expression 14, a waveform of emitted light that gradually rises before the start of signal accumulation, such as that shown in FIG. 7, may be used to obtain a similar effect.

In the foregoing, the waveform of emitted light whose emission intensity is represented by a linear function is described as an example for the sake of simplicity of calculation. Any waveform in which the emission intensity has a peak in the vicinity of the start of signal accumulation and attenuates during the signal accumulation period, may be used to obtain a similar effect. Such a waveform may include those approximated by a higher-order polynomial, irrational function, exponential function, etc. As an example, the waveform of emitted light is assumed to be represented by the following quadratic function:

$$I = 1 - \left(\frac{t}{T_0}\right)^2 (0 \le t \le T_0) \quad (27)$$
$$I = 0 (t \le 0, T_0 \le t)$$

It is assumed that the sensor 4 obtains the signal amounts $S_0$ and $S_2$ during the same signal accumulation periods as those shown in FIG. 5 and Expression 24. In this case, the object distance D and the signal amount $S_2$ has a nonlinear relationship represented by:

$$D = D_0 \left(\frac{S_2}{S_0}\right)^{\frac{1}{3}} \quad (28)$$

In this case, in the vicinity of $D/D_0=1$, the proportion of a change in $D/D_0$ to a change in $S_2/S_0$ is 1/3, and, the absolute value is 1/3 compared to the conventional change proportion of −1. Thus, the improvement in distance measurement accuracy based on the signal amount change proportion is more significant than in the case of FIG. 6. In addition, in the vicinity of $D/D_0=1$, the signal amount $S_2$ is largest and shot noise is smallest, and therefore, the distance measurement accuracy is further improved. This is similar to the case of FIG. 6.

Thus, the waveform of emitted light of Expression 14 and the signal accumulation periods of Expression 24 provide a nonlinear relationship expression between a signal amount and a distance that is represented by Expression 26. Also, the waveform of emitted light of Expression 27 and the signal accumulation periods of Expression 24 provide a nonlinear relationship expression between a signal amount and a distance that is represented by Expression 28. In other words, if the calculation device 9 includes a calculation expression representing a relationship between a signal amount and a distance that corresponds to the waveform of emitted light, a distance measuring system that achieves the distance measuring method of this embodiment can be provided.

Also, if it is practically difficult to analytically calculate a relationship between a signal amount and a distance from the waveform of emitted light, or it is difficult to approximate the waveform of emitted light using a function, a correlation shown in FIG. 4 or 6 may be obtained by actual measurement. The thus-obtained lookup table between a signal amount and a distance may be stored in the storage device 11. By incorporating the storage device 11 into a distance measuring system, the distance measuring system can achieve the distance measuring method of this embodiment.

(Second Embodiment): Improvement in Accuracy of Short Distance

A configuration of a TOF distance measuring system according to a second embodiment is substantially similar to that of the first embodiment, and is not shown in the drawings.

In this embodiment, the light source 10 emits light having a non-uniform waveform that has a peak intensity during an end emission period, instead of a rectangular wave pulse, in order to improve the accuracy of distance measurement for a short distance close to the lower limit of a distance measurement range. Specifically, the emission intensity of the light source 10 is set to be higher during an end portion of the emission period than during the other portion of the emission period.

Here, as an example, it is assumed that the waveform of emitted light whose emission intensity is represented by a linear function is employed.

Figure 8:
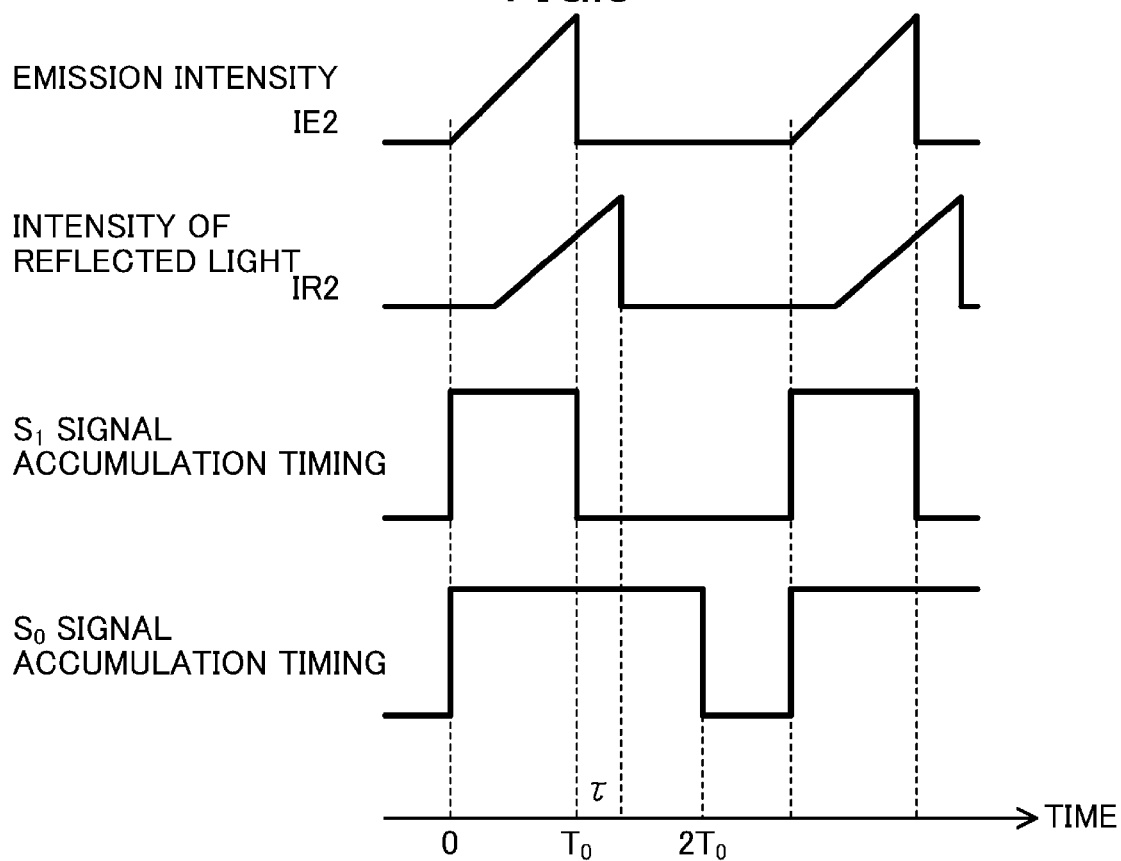
FIG. 8 is a timing chart showing an example waveform of light emitted by a light source, an example waveform of reflected light, and example timings of signal accumulation by a sensor, in the second embodiment.

FIG. 8 is a timing chart showing an example waveform of light emitted by the light source 10, an example waveform of reflected light, and example timings of signal accumulation by the sensor 4, according to this embodiment. In FIG. 8, the light source 10 emits light during an emission period of 0-$T_0$, and the sensor 4 receives the reflected light. The waveform IR2 of the reflected light is delayed from the waveform IE2 of the emitted light by a time τ.

The waveform IE2 of the emitted light may be represented by:

$$I = \frac{t}{T_0} (0 \le t \le T_0) \quad (29)$$
$$I = 0 (t \le 0, T_0 \le t)$$

where the amplitude of the waveform IE2 of the emitted light is normalized to one for the sake of simplicity.

The waveform IR2 of the reflected light may be represented by:

$$I' = r\left(\frac{t-\tau}{T_0}\right)(\tau \le t \le T_0 + \tau) \quad (30)$$
$$I' = 0 (t \le \tau, T_0 + \tau \le t)$$

where r represents an attenuation rate due to reflection or diffusion of light.

The sensor 4 accumulates a plurality of signal amounts obtained by converting the reflected light into an electrical signal during respective accumulation periods that are different from each other in at least one of the start time and the end time. In the example of FIG. 8, the accumulation periods of signal amounts $S_0$ and $S_1$ are represented, respectively, by:

$$S_0: 0 \le t \le 2T_0$$

$$S_1: 0 \le t \le T_0 \quad (31)$$

In this case, the signal amounts $S_0$ and $S_1$ accumulated by the sensor 4 are represented by:

$$S_0 = \frac{rT_0}{2} \quad (32)$$

$$S_1 = r\left(\frac{T_0 - \tau}{2T_0}\right)^2$$

Accordingly, the delay $\tau$ due to reflection of the emitted light may be calculated by:

$$\tau = T_0\left(1 - \sqrt{\frac{S_1}{S_0}}\right) \quad (33)$$

Therefore, if the light source 10 and the sensor 4 are located at approximately the same position, a distance D to an object is calculated from the detected signal amounts $S_0$ and $S_1$ by:

$$D = \frac{c\tau}{2} = \frac{cT_0}{2}\left(1 - \sqrt{\frac{S_1}{S_0}}\right) \quad (34)$$

where $T_0$ represents the pulse width of the emitted light, and c represents the speed of light.

In the above expression, the distance D and the signal amount $S_1/S_0$ have a nonlinear relationship. From the signal accumulation periods represented by Expression 31, the following is obtained:

$$0 \le S_1 \le S_0 \quad (35)$$

Therefore, the distance measurement range $D_0$ determined by light having the pulse width $T_0$ is represented by:

$$D_0 = \frac{cT_0}{2} \quad (36)$$

Therefore, Expression 34 may also be represented by:

$$D = D_0\left(1 - \sqrt{\frac{S_1}{S_0}}\right) \quad (37)$$

When an image sensor is used for the detection, signal amounts $S_0(x, y)$ and $S_1(x, y)$ corresponding to coordinates (x, y) of each pixel may be measured, and an object distance D(x, y) corresponding to each pixel may be calculated, as in Expression 34, by:

$$D(x, y) = \frac{cT_0}{2}\left(1 - \sqrt{\frac{S_1(x, y)}{S_0(x, y)}}\right) = D_0\left(1 - \sqrt{\frac{S_1(x, y)}{S_0(x, y)}}\right) \quad (38)$$

Here, from the waveform of emitted light represented by Expression 29 and the timings of signal accumulation represented by Expression 31, it is obvious that the signal amount $S_0$ is constant independently of the distance to an object to be measured. Specifically, a relationship between $S_1/S_0$ and $D/D_0$ represents a relationship between the distance to an object to be measured and the accumulated signal amount.

Figure 9:
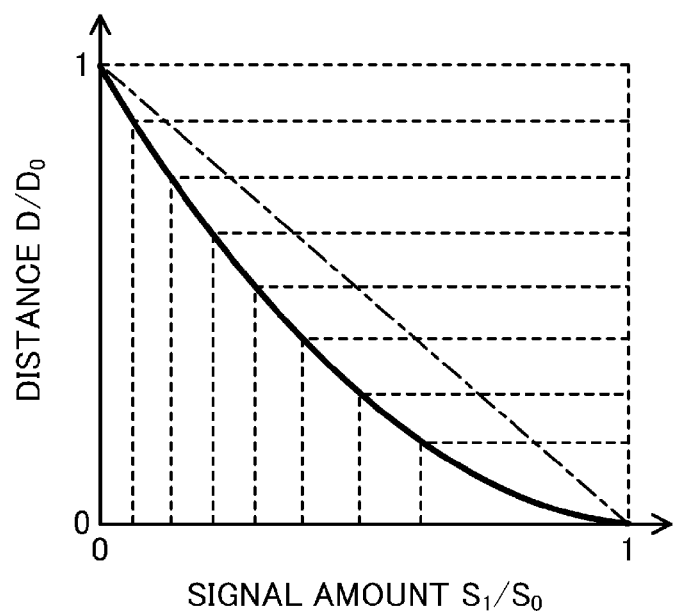
FIG. 9 is a graph showing a relationship between a distance to an object to be measured and a signal amount, that corresponds to FIG. 8.

FIG. 9 is a graph plotted based on Expression 37 to show the relationship between $S_1/S_0$ and $D/D_0$. In FIG. 9, the vicinity of $S_1/S_0=1$ corresponds to the vicinity of $D/D_0=0$, i.e., a short distance close to the sensor 4 or the light source 10. Moreover, in the vicinity of $D/D_0=0$, the proportion of a change in $D/D_0$ to a change in $S_1/S_0$ is $-1/2$, and the absolute value is 1/2 compared to the conventional change proportion of $-1$. This means that even if the measurement accuracy of the signal amount $S_1$ of the sensor 4, which is an observed amount, is the same as the conventional one, the distance measurement accuracy is twice as high as the conventional one.

In other words, the proportion of a change in the distance D to a change in the signal amount $S_1$ is smaller in the vicinity of the lower limit of the distance measurement range than in the other portion of the distance measurement range. This improves the distance measurement accuracy in the vicinity of the lower limit of the distance measurement range.

The accuracy of measurement of a signal amount will now be described in greater detail. As described above, shot noise of a signal amount is dominant in the signal amount measurement accuracy. As the signal amount increases, the signal amount is less affected by shot noise. In FIG. 9, the variation in the distance D due to an error in the signal amount $S_1$ is smallest when the signal amount $S_1$ is in the vicinity of the largest value ($S_1/S_0$ is in the vicinity of 1), i.e., when the shot noise of the signal amount $S_1$ is smallest. Therefore, this improvement in the signal amount measurement accuracy contributes to an improvement in the distance measurement accuracy, and therefore, the improvement in the distance measurement accuracy is further increased.

Figure 10:
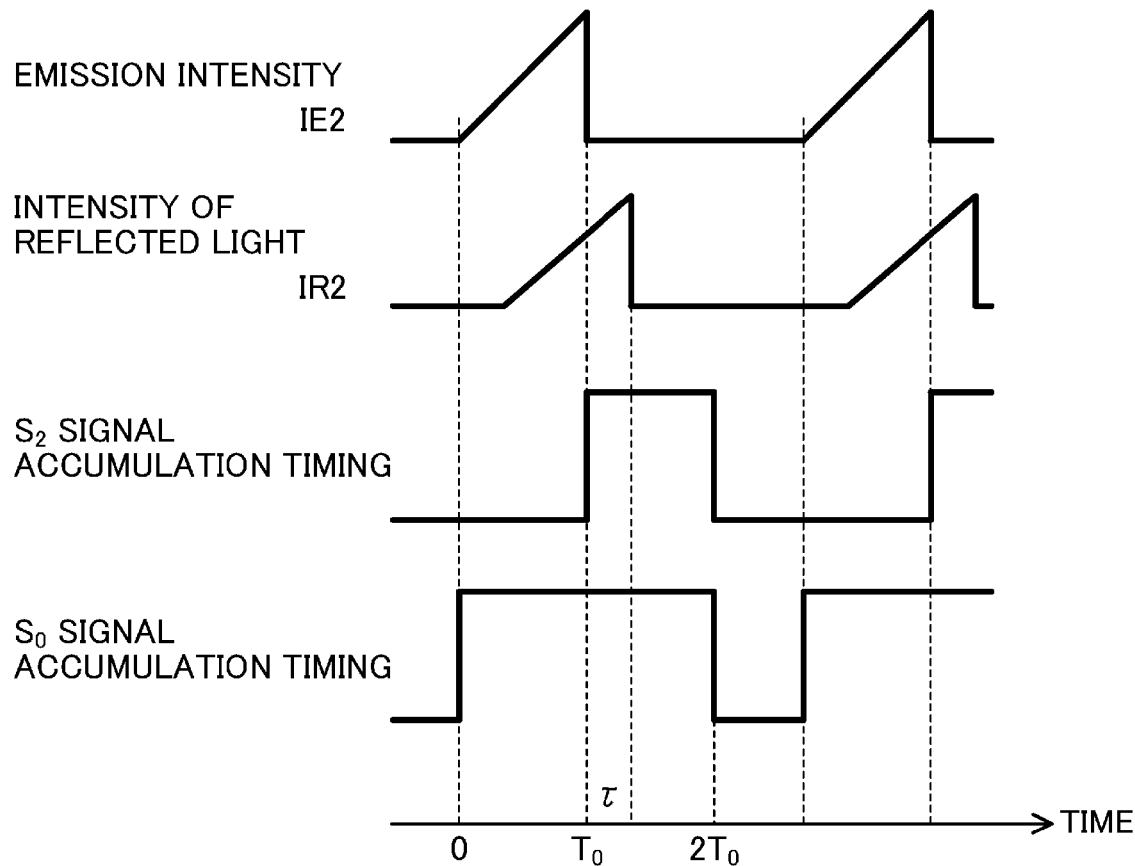
FIG. 10 is a timing chart showing another example waveform of light emitted by a light source, another example waveform of reflected light, and another example set of timings of signal accumulation by a sensor, in the second embodiment.

FIG. 10 is a timing chart showing another example waveform of light emitted by the light source 10, another example waveform of reflected light, and another example set of timings of signal accumulation by the sensor 4, according to this embodiment. In FIG. 10, instead of the signal amount $S_1$, a signal amount $S_2$ is obtained that corresponds to an accumulation period represented by:

$$S_0: 0 \le t \le 2T_0$$

$$S_2: T_0 \le t \le 2T_0 \quad (39)$$

Obviously, the signal amount $S_2$ and the above signal amount $S_1$ have a relationship represented by:

$$S_2 = S_0 - S_1 \quad (40)$$

Therefore, the signal amount $S_2$ and the distance D has a relationship that is a counterpart of Expression 37, represented by:

$$D = D_0\left(1 - \sqrt{1 - \frac{S_2}{S_0}}\right) \quad (41)$$

Figure 11:
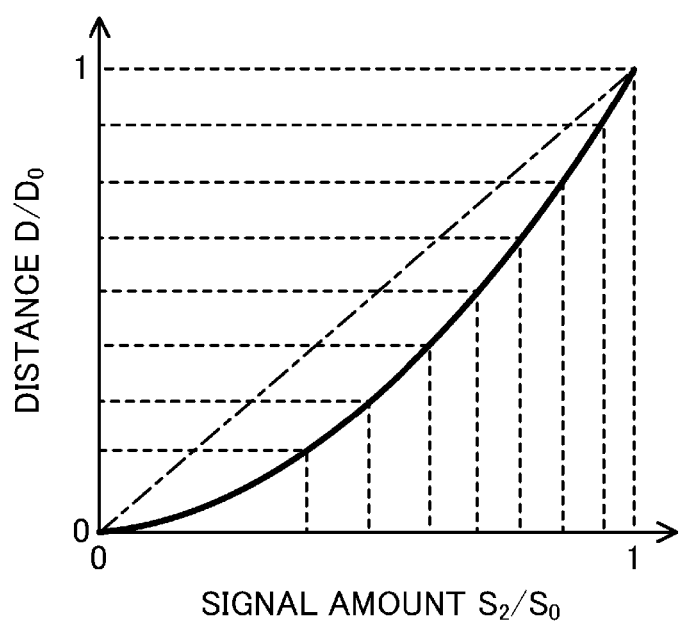
FIG. 11 is a graph showing a relationship between a distance to an object to be measured and a signal amount, that corresponds to FIG. 10.

FIG. 11 is a graph plotted based on Expression 41 to show the relationship between $S_2/S_0$ and $D/D_0$. In FIG. 11, in the vicinity of $D/D_0=0$, i.e., at a short distance close to the sensor 4 or the light source 10, the proportion of a change in $D/D_0$ to a change in $S_2/S_0$ is 1/2, and the absolute value is 1/2 compared to the conventional change proportion of −1. However, in FIG. 11, the variation in the distance D due to an error in the signal amount $S_2$ is smallest when the signal amount $S_2$ is in the vicinity of 0, i.e., when the shot noise of the signal amount $S_2$ is largest. Therefore, the relationship of FIG. 9 is more preferable than the relationship of FIG. 11 in terms of the signal amount measurement accuracy.

Thus, when importance is put on the distance measurement accuracy for a short distance as in this embodiment, it may be preferable that, as with the signal amount $S_1$ of FIG. 8, the signal accumulation period be set so that a larger signal amount is accumulated as the delay τ due to reflected wave decreases.

Thus, according to this embodiment, if the emission intensity of the light source 10 is set to be higher during an end portion of the emission period than during the other portion of the emission period, the proportion of a change in the distance to an object to be measured to a change in the accumulated signal amount of the sensor 4 is smaller in the vicinity of the lower limit of the distance measurement range than in the other portion of the distance measurement range. As a result, the distance measurement accuracy in the vicinity of the lower limit of the distance measurement range can be improved. Also, if the signal accumulation period is set so that the accumulated signal amount is largest when an object to be measured is in the vicinity of the lower limit of the distance measurement range, shot noise can be reduced in the vicinity of the lower limit of the distance measurement range. As a result, the distance measurement accuracy in the vicinity of the lower limit of the distance measurement range can be further improved.

Although the signal accumulation periods of the sensor 4 are assumed above to be those shown in FIG. 8 and Expression 31 or FIG. 10 and Expression 39, the present disclosure is not limited to this. For example, the accumulation period of the signal amount $S_0$ may be longer or shorter than $2T_0$. The accumulation period of the signal amount $S_1$ may be longer or shorter than $T_0$, and the start time may not be the same as that of the accumulation period of the signal amount $S_0$. The accumulation period of the signal amount $S_2$ may be longer or shorter than $T_0$, and the end time may not be the same as that of the accumulation period of the signal amount $S_0$. In addition, for example, the signal amounts $S_1$ and $S_2$ may be measured, and the signal amount $S_0$ may be calculated from Expression 40. Specifically, a plurality of signal accumulation periods that are different from each other in at least one of the start time and the end time may be provided, and a distance to an object may be calculated using a plurality of signal amounts accumulated during these signal accumulation periods.

Figure 12:
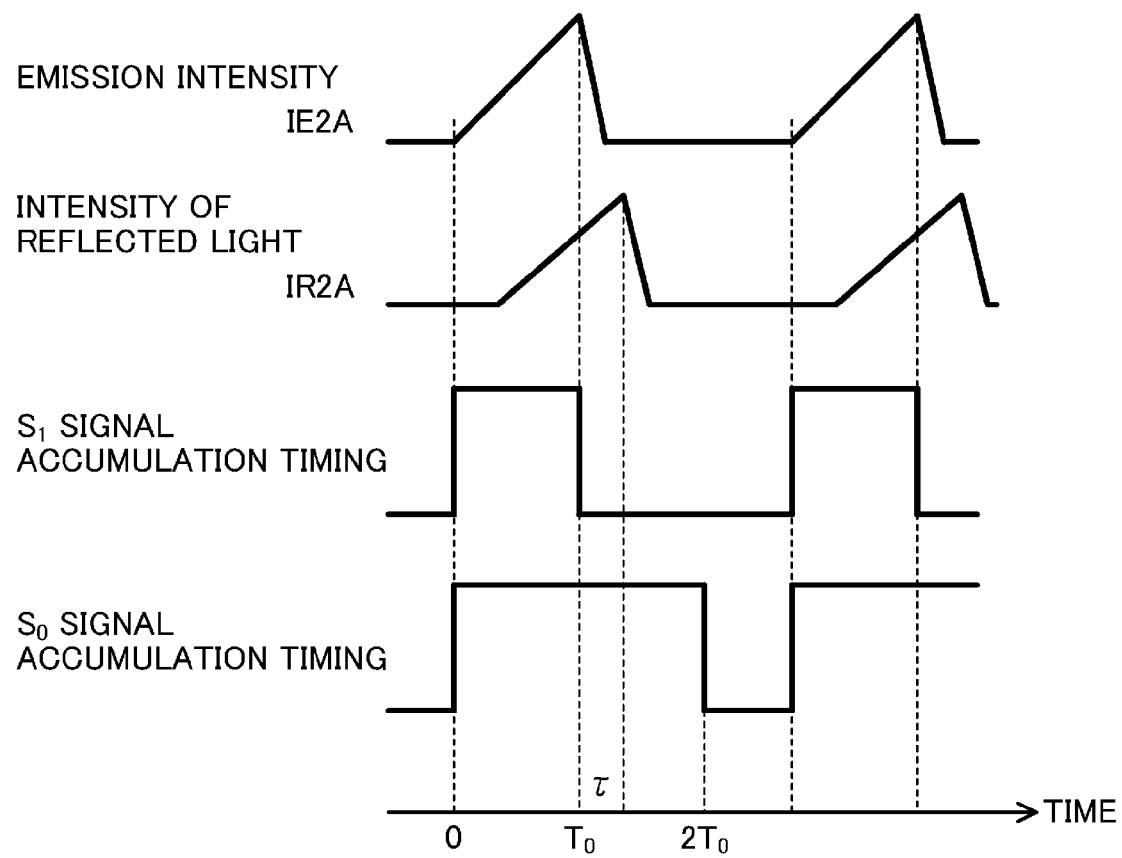
FIG. 12 is a diagram showing another example waveform of light emitted by a light source in the second embodiment.

Although the emission intensity of the light source 10 is assumed above to be zero during the period other than the signal accumulation period, the present disclosure is not limited to this. The relative relationship between the waveform of light emitted by the light source 10 and the signal accumulation by the sensor 4 is critically important. For example, it is obvious that if it is practically difficult to produce the waveform of emitted light that is represented by Expression 29, a waveform of emitted light that gradually falls after time $T_0$, such as that shown in FIG. 12, may be used to obtain a similar effect. Similarly, light emission may begin before the start of signal accumulation.

In the foregoing, the waveform of emitted light whose emission intensity is represented by a linear function is described as an example for the sake of simplicity of calculation. Any waveform in which the emission intensity has a peak in the vicinity of the emission end time $T_0$ and increases during the signal accumulation period, may be used to obtain a similar effect. Such a waveform may include those approximated by a higher-order polynomial, irrational function, exponential function, etc. As an example, the waveform of emitted light is assumed to be represented by the following quadratic function:

$$I = \left(\frac{t}{T_0}\right)^2 (0 \leq t \leq T_0) \tag{42}$$

$$I = 0 (t \leq 0, T_0 \leq t)$$

It is assumed that the sensor 4 obtains the signal amounts $S_0$ and $S_1$ during the same signal accumulation periods as those shown in FIG. 8 and Expression 31. In this case, the object distance D and the signal amount $S_1$ has a nonlinear relationship represented by:

$$D = D_0\left(1 - \left(\frac{S_1}{S_0}\right)^{\frac{1}{3}}\right) \tag{43}$$

In this case, in the vicinity of $D/D_0=0$, the proportion of a change in $D/D_0$ to a change in $S_1/S_0$ is −1/3, and, the absolute value is 1/3 compared to the conventional change proportion of −1. Thus, the improvement in distance measurement accuracy based on the signal amount change proportion is more significant than in the case of FIG. 9. In addition, in the vicinity of $D/D_0=0$, the signal amount $S_1$ is largest and shot noise is smallest, and therefore, the distance measurement accuracy is further improved. This is similar to the case of FIG. 9.

In this embodiment, as in the first embodiment, if the calculation device 9 includes a calculation expression representing a relationship between a signal amount and a distance that corresponds to the waveform of emitted light, a distance measuring system that achieves the distance measuring method of this embodiment can be provided.

Also, if it is practically difficult to analytically calculate a relationship between a signal amount and a distance from the waveform of emitted light, or it is difficult to approximate the waveform of emitted light using a function, a correlation shown in FIG. 9 or 11 may be obtained by actual measurement. The thus-obtained lookup table between a signal amount and a distance may be stored in the storage device 11. By incorporating the storage device 11 into a distance measuring system, the distance measuring system can achieve the distance measuring method of this embodiment.

(Third Embodiment): Improvement in Accuracy for Middle Distance

A configuration of a TOF distance measuring system according to a third embodiment is substantially similar to that of the first embodiment, and is not shown in the drawings.

In this embodiment, the light source 10 emits light having a waveform that has a peak intensity at substantially the middle of an emission period, instead of a rectangular wave pulse, in order to improve the accuracy of distance measurement in the vicinity of the middle of a distance measurement range. Specifically, the emission intensity of the light source 10 is set to be higher during a middle portion of the emission period than during the other portion of the emission period.

Here, as an example, it is assumed that the waveform of emitted light whose emission intensity is represented by a linear function is employed.

Figure 13:
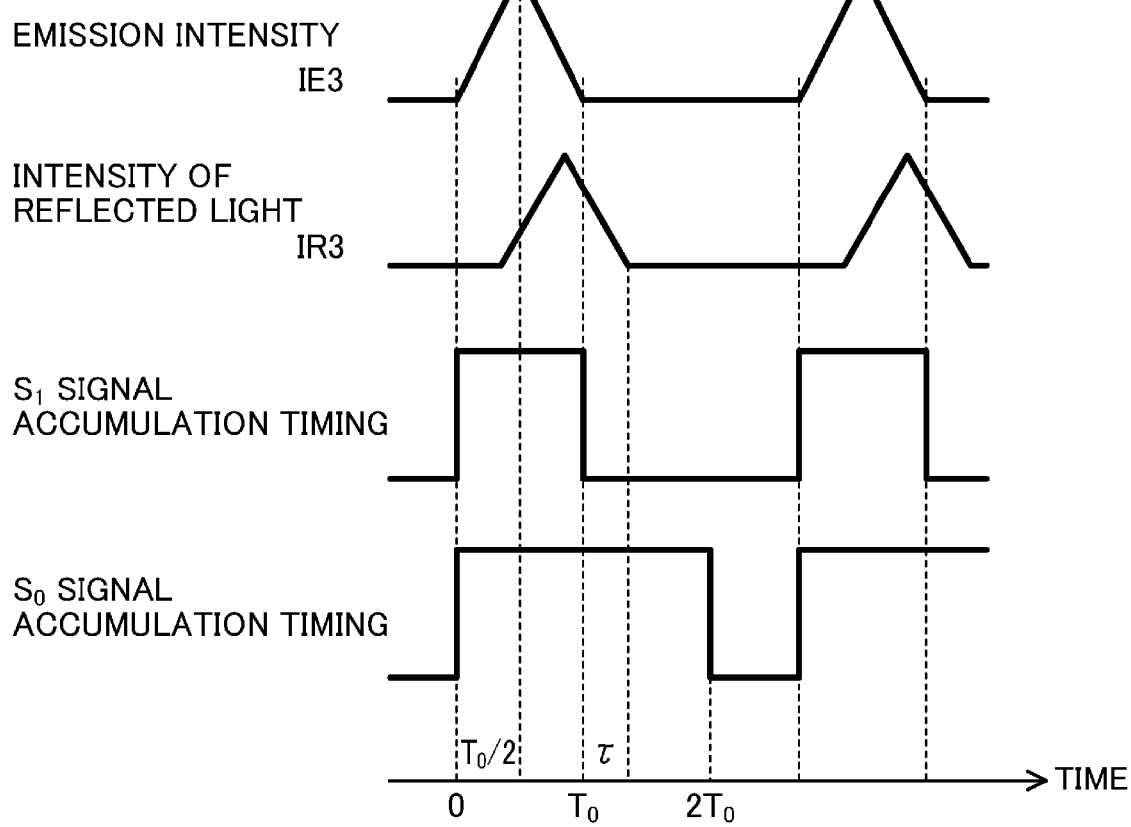
FIG. 13 is a timing chart showing an example waveform of light emitted by a light source, an example waveform of reflected light, and example timings of signal accumulation by a sensor, in the third embodiment.

FIG. 13 is a timing chart showing an example waveform of light emitted by the light source 10, an example waveform of reflected light, and example timings of signal accumulation by the sensor 4, according to this embodiment. In FIG. 13, the light source 10 emits light during an emission period of $0$-$T_0$, and the sensor 4 receives the reflected light. The waveform IR3 of the reflected light is delayed from the waveform IE3 of the emitted light by a time $\tau$.

The waveform IE3 of the emitted light may be represented by:

$$I = \frac{2t}{T_0} \left( 0 \le t \le \frac{T_0}{2} \right) \tag{44}$$
$$I = 2\left(1 - \frac{t}{T_0}\right)\left(\frac{T_0}{2} \le t \le T_0\right)$$
$$I = 0 (t \le 0, T_0 \le t)$$

where the amplitude of the waveform IE3 of the emitted light is normalized to one for the sake of simplicity.

The waveform IR3 of the reflected light may be represented by:

$$I' = 2r\left(\frac{t-\tau}{T_0}\right)\left(\tau \le t \le \frac{T_0}{2} + \tau\right) \tag{45}$$
$$I' = 2r\left(1 - \frac{t-\tau}{T_0}\right)\left(\frac{T_0}{2} + \tau \le t \le T_0 + \tau\right)$$
$$I' = 0 (t \le \tau, T_0 + \tau \le t)$$

where r represents an attenuation rate due to reflection or diffusion of light.

The sensor 4 accumulates a plurality of signal amounts obtained by converting the reflected light into an electrical signal during respective accumulation periods that are different from each other in at least one of the start time and the end time. In the example of FIG. 13, the accumulation periods of signal amounts $S_0$ and $S_1$ are represented, respectively, by:

$$S_0: 0 \le t \le 2T_0$$
$$S_1: 0 \le t \le T_0 \tag{46}$$

In this case, the signal amounts $S_0$ and $S_1$ accumulated by the sensor 4 are represented by:

$$S_0 = \frac{rT_0}{2} \tag{47}$$
$$S_1 = \frac{rT_0}{2} - r\frac{\tau^2}{T_0}$$
when
$$0 \le \tau \le \frac{T_0}{2}$$

$$S_0 = \frac{rT_0}{2} \tag{48}$$
$$S_1 = r\frac{(T_0 - \tau)^2}{T_0}$$
when
$$\frac{T_0}{2} \le \tau \le T_0$$

Accordingly, the delay $\tau$ due to reflection of the emitted light may be calculated by:

$$\tau = T_0 \sqrt{\frac{1}{2} - \frac{S_1}{2S_0}} \tag{49}$$
when
$$0 \le \tau \le \frac{T_0}{2}$$

$$\tau = T_0 \left(1 - \sqrt{\frac{S_1}{2S_0}}\right) \tag{50}$$
when
$$\frac{T_0}{2} \le \tau \le T_0$$

Therefore, if the light source 10 and the sensor 4 are located at approximately the same position, a distance D to an object is calculated from the detected signal amounts $S_0$ and $S_1$ by:

$$D = \frac{c\tau}{2} = \frac{cT_0}{2}\sqrt{\frac{1}{2} - \frac{S_1}{2S_0}} \tag{51}$$
when
$$0 \le \tau \le \frac{T_0}{2}$$

$$D = \frac{c\tau}{2} = \frac{cT_0}{2}\left(1 - \sqrt{\frac{S_1}{2S_0}}\right) \tag{52}$$
when
$$\frac{T_0}{2} \le \tau \le T_0$$

where $T_0$ represents the pulse width of the emitted light, and c represents the speed of light.

In the above expression, the distance D and the signal amount $S_1/S_0$ have a nonlinear relationship. From the signal accumulation periods represented by Expression 46, the following is obtained:

$$0 \le S_1 \le S_0 \tag{53}$$

Therefore, the distance measurement range $D_0$ determined by light having the pulse width $T_0$ is represented by:

$$D_0 = \frac{cT_0}{2} \tag{54}$$

Therefore, Expressions 51 and 52 may also be represented by:

$$D = D_0 \sqrt{\frac{1}{2} - \frac{S_1}{2S_0}} \quad (55)$$

when $$0 \leq \tau \leq \frac{T_0}{2}$$

$$D = D_0 \left(1 - \sqrt{\frac{S_1}{2S_0}}\right) \quad (56)$$

when $$\frac{T_0}{2} \leq \tau \leq T_0$$

When an image sensor is used for the detection, signal amounts $S_0(x, y)$ and $S_1(x, y)$ corresponding to coordinates $(x, y)$ of each pixel may be measured, and an object distance $D(x, y)$ corresponding to each pixel may be calculated, as in Expressions 51 and 52, by:

$$D(x, y) = \frac{cT_0}{2}\sqrt{\frac{1}{2} - \frac{S_1(x, y)}{2S_0(x, y)}} = D_0 \sqrt{\frac{1}{2} - \frac{S_1(x, y)}{2S_0(x, y)}} \quad (57)$$

when $$0 \leq \tau \leq \frac{T_0}{2}$$

$$D(x, y) = \frac{cT_0}{2}\left(1 - \sqrt{\frac{S_1(x, y)}{2S_0(x, y)}}\right) = D_0\left(1 - \sqrt{\frac{S_1(x, y)}{2S_0(x, y)}}\right) \quad (58)$$

when $$\frac{T_0}{2} \leq \tau \leq T_0$$

Here, from the waveform of emitted light represented by Expression 44 and the timings of signal accumulation represented by Expression 46, it is obvious that the signal amount $S_0$ is constant independently of the distance to an object to be measured. Specifically, a relationship between $S_1/S_0$ and $D/D_0$ represents a relationship between the distance to an object to be measured and the accumulated signal amount.

Figure 14:
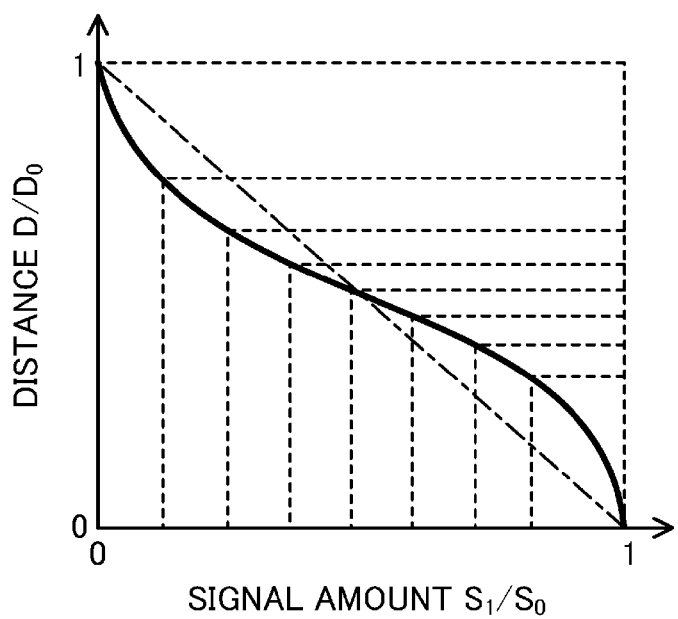
FIG. 14 is a graph showing a relationship between a distance to an object to be measured and a signal amount, that corresponds to FIG. 13.

FIG. 14 is a graph plotted based on Expressions 55 and 56 to show the relationship between $S_1/S_0$ and $D/D_0$. In FIG. 14, the vicinity of $S_1/S_0=0$ corresponds to the vicinity of $D/D_0=1$, i.e., the vicinity of the upper limit of the distance measurement range that is a longest distance from the sensor 4 or the light source 10. Moreover, in the vicinity of $D/D_0=1/2$, the proportion of a change in $D/D_0$ to a change in $S_1/S_0$ is $-1/2$, and the absolute value is 1/2 compared to the conventional change proportion of $-1$. This means that even if the measurement accuracy of the signal amount $S_1$ of the sensor 4, which is an observed amount, is the same as the conventional one, the distance measurement accuracy is twice as high as the conventional one.

In other words, the proportion of a change in the distance D to a change in the signal amount $S_1$ is smaller in the vicinity of the middle of the distance measurement range than in the other portion of the distance measurement range. This improves the distance measurement accuracy in the vicinity of the middle of the distance measurement range.

The accuracy of measurement of a signal amount will now be described in greater detail. As described above, shot noise of a signal amount is dominant in the signal amount measurement accuracy. As the signal amount increases, the signal amount is less affected by shot noise. In FIG. 14, the variation in the distance D due to an error in the signal amount $S_1$ is smallest when the signal amount $S_1$ is in the vicinity of the half value ($S_1/S_0$ is in the vicinity of 1/2). In other words, the influence of shot noise is larger in the vicinity of $D/D_0=1/2$ than in the vicinity of D=0 where the signal amount $S_1$ is largest. Therefore, there is still room for improvement in the distance measurement accuracy in view of the signal amount measurement accuracy.

Figure 15:
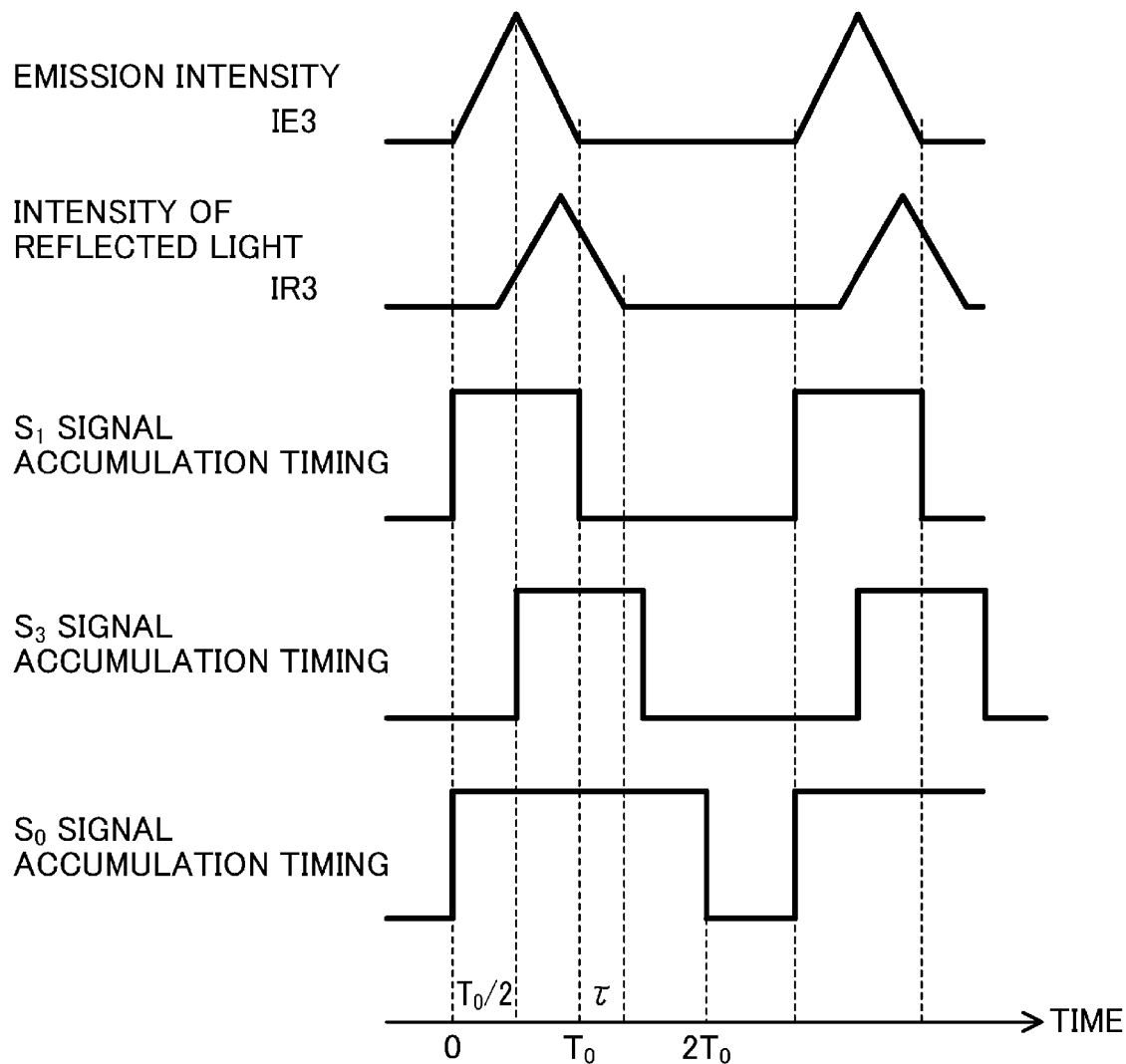
FIG. 15 is a timing chart showing another example waveform of light emitted by a light source, another example waveform of reflected light, and another example set of timings of signal accumulation by a sensor, in the third embodiment.

FIG. 15 is a timing chart showing another example waveform of light emitted by the light source 10, another example waveform of reflected light, and another example set of timings of signal accumulation by the sensor 4, according to this embodiment. In FIG. 15, in order to further improve the distance measurement accuracy, a signal amount $S_3$ is obtained that corresponds to an accumulation period represented by:

$$S_0: 0 \leq t \leq 2T_0 \quad (59)$$

$$S_1: 0 \leq t \leq \frac{T_0}{2}$$

$$S_3: \frac{T_0}{2} \leq t \leq \frac{3T_0}{2}$$

Thus, the accumulation period of the signal amount $S_3$ starts from time $T_0/2$. In this case, the signal amount $S_3$ and the distance D corresponding to Expressions 55 and 56 have a relationship represented by:

$$D = D_0\left(\frac{1}{2} + \sqrt{\frac{1}{2} - \frac{S_3}{2S_0}}\right) \quad (60)$$

when $$0 \leq \tau \leq \frac{T_0}{2}$$

$$D = D_0\left(\frac{1}{2} - \sqrt{\frac{1}{2} - \frac{S_1}{2S_0}}\right) \quad (61)$$

when $$\frac{T_0}{2} \leq \tau \leq T_0$$

Thus, the object distance D can also be calculated using the signal amount $S_3$.

Figure 16:
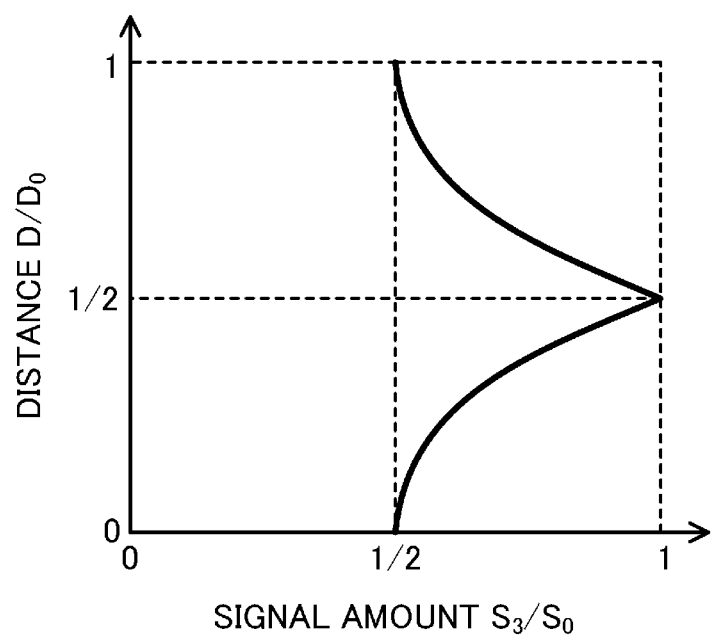
FIG. 16 is a graph showing a relationship between a distance to an object to be measured and a signal amount, that corresponds to FIG. 15.

FIG. 16 is a graph plotted based on Expressions 60 and 61 to show the relationship between $S_3/S_0$ and $D/D_0$. In FIG. 16, in the case of the distance $D/D_0=1/2$, the proportion of a change in $D/D_0$ to a change in $S_3/S_0$ is $\pm 1/2$, and $S_3/S_0=1$. In other words, a range within which a change in $D/D_0$ is smallest with respect to a change in $S_3/S_0$ coincides with a range within the signal amount $S_3$ has a largest value and the ratio of shot noise is smallest. Therefore, the distance measurement accuracy is further improved.

Note that if $D/D_0=1/2 \pm d$ (d is arbitrary), the signal amount $S3/S_0$ has the same value. Therefore, in order to obtain the distance D within the distance measurement range $D_0$, it is preferable to use the above signal amount $S_1$, $S_2$, etc. in combination with the signal amounts $S_0$ and $S_3$.

Thus, when importance is put on the distance measurement accuracy for a middle distance as in this embodiment, it may be preferable that, as with the signal amount $S_3$ of FIG. 15, the signal accumulation period be set so that a larger signal amount is accumulated when the delay $\tau$ due to reflected wave is about half the emission period.

Thus, according to this embodiment, if the emission intensity of the light source 10 is set to be higher during a middle portion of the emission period than during the other portion of the emission period, the proportion of a change in the distance to an object to be measured to a change in the accumulated signal amount of the sensor 4 is smaller in the vicinity of the middle of the distance measurement range than in the other portion of the distance measurement range. As a result, the distance measurement accuracy in the vicinity of the middle of the distance measurement range can be improved. Also, if the signal accumulation period is set so that the accumulated signal amount is largest when an object to be measured is in the vicinity of the middle of the distance measurement range, shot noise can be reduced in the vicinity of the middle of the distance measurement range. As a result, the distance measurement accuracy in the vicinity of the middle of the distance measurement range can be further improved.

Although the signal accumulation periods of the sensor 4 are assumed above to be those shown in FIG. 13 and Expression 46 or FIG. 15 and Expression 59, the present disclosure is not limited to this. For example, the accumulation period of the signal amount $S_0$ may be longer or shorter than $2T_0$. The accumulation period of the signal amount $S_1$ may be longer or shorter than $T_0$, and the start time may not be the same as that of the accumulation period of the signal amount $S_0$. The accumulation period of the signal amount $S_3$ may be longer or shorter than $T_0$, and the start time may not be the same as time $T_0/2$. Specifically, a plurality of signal accumulation periods that are different from each other in at least one of the start time and the end time may be provided, and a distance to an object may be calculated using a plurality of signal amounts accumulated during these signal accumulation periods.

Figure 17:
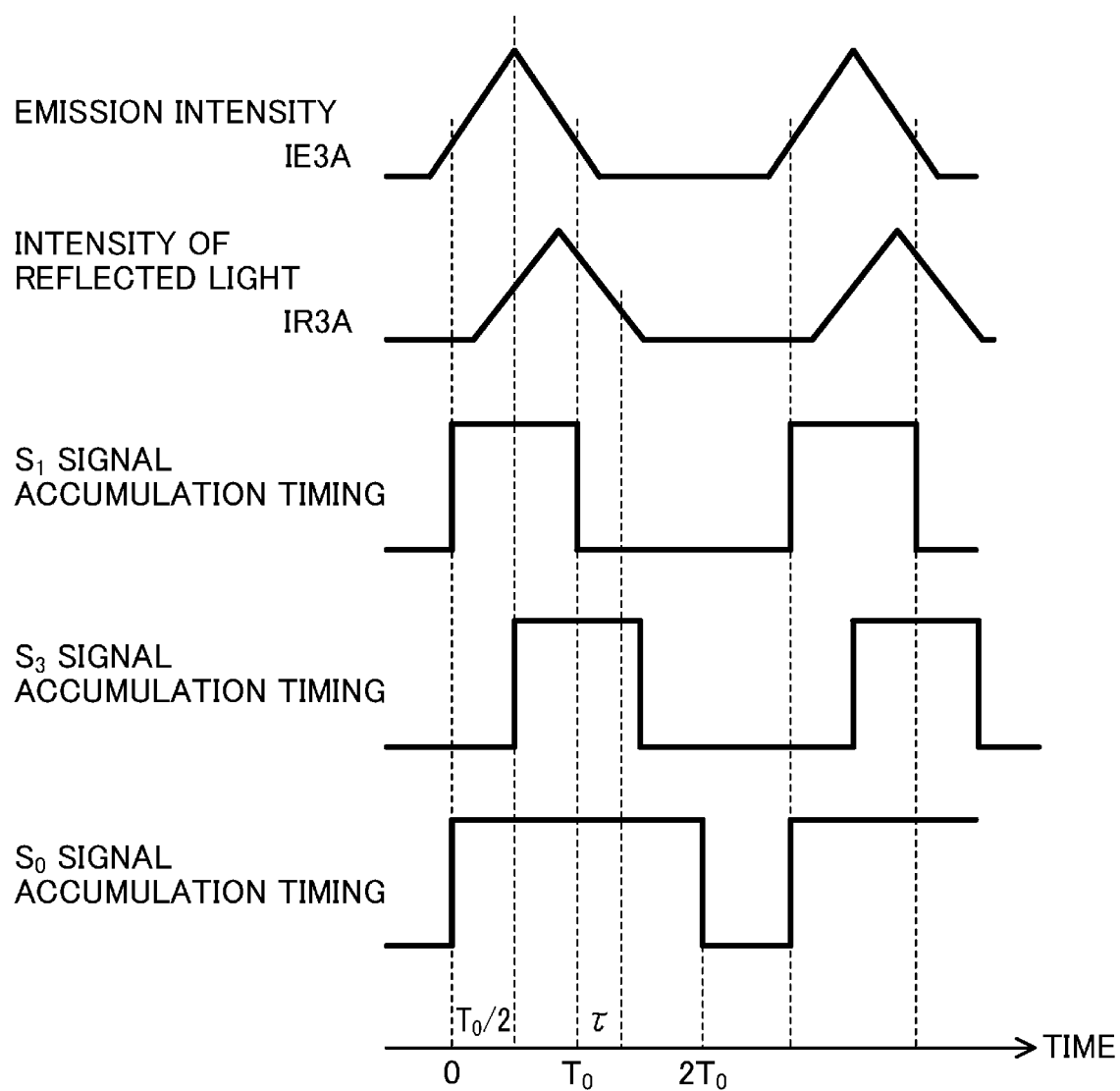
FIG. 17 is a diagram showing another example waveform of light emitted by a light source in the third embodiment.

Although the emission intensity of the light source 10 is assumed above to be zero during the period other than the signal accumulation period, the present disclosure is not limited to this. The relative relationship between the waveform of light emitted by the light source 10 and the signal accumulation by the sensor 4 is critically important. For example, it is obvious that if it is practically difficult to produce the waveform of emitted light that is represented by Expression 44, a waveform of emitted light that gradually rises before time 0 or gradually falls after time $T_0$, such as that shown in FIG. 17, may be used to obtain a similar effect.

In the foregoing, the waveform of emitted light whose emission intensity is represented by a linear function is described as an example for the sake of simplicity of calculation. Any waveform in which the emission intensity has a peak in the vicinity of the middle of the emission period, may be used to obtain a similar effect. Such a waveform may include those approximated by a higher-order polynomial, irrational function, exponential function, etc. Alternatively, a waveform of emitted light whose emission intensity is represented by a function having a rise and a fall that are not symmetrical, may be employed.

In this embodiment, as in the first and second embodiments, if the calculation device 9 includes a calculation expression representing a relationship between a signal amount and a distance that corresponds to the waveform of emitted light, a distance measuring system that achieves the distance measuring method of this embodiment can be provided.

Also, if it is practically difficult to analytically calculate a relationship between a distance and a signal amount from the waveform of emitted light, or it is difficult to approximate the waveform of emitted light using a function, a correlation shown in FIG. 14 or 16 may be obtained by actual measurement. The thus-obtained lookup table between a signal amount and a distance may be stored in the storage device 11. By incorporating the storage device 11 into a distance measuring system, the distance measuring system can achieve the distance measuring method of this embodiment.

(Fourth Embodiment): Adjustment of Distance for Improvement in Accuracy

Figure 18:
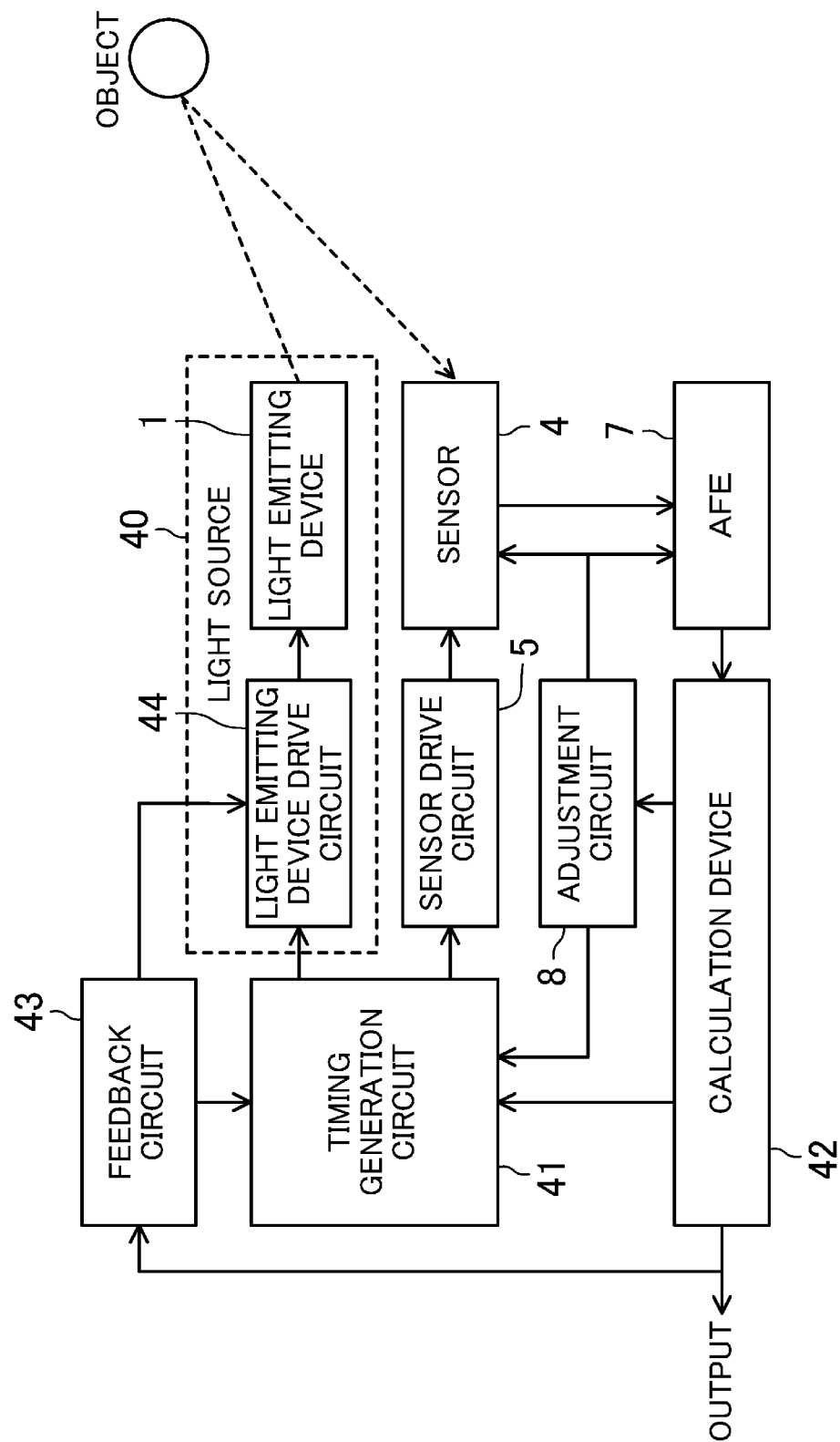
FIG. 18 is a block diagram showing an example configuration of a TOF distance measuring system according to a fourth embodiment.
Figure 19:
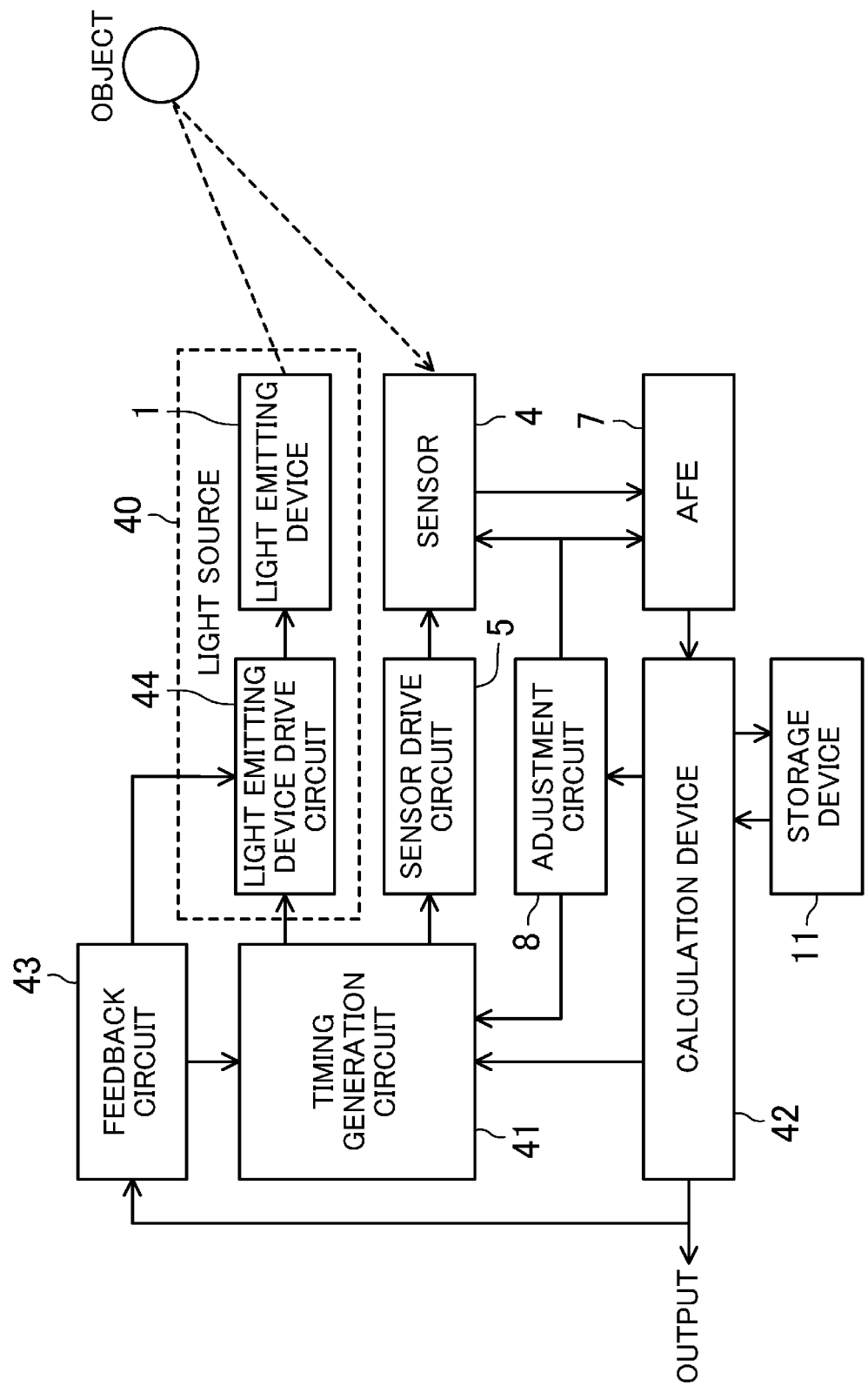
FIG. 19 is a block diagram showing another example configuration of the TOF distance measuring system of the fourth embodiment.

FIGS. 18 and 19 are block diagrams showing an example configuration of a TOF distance measuring system according to a fourth embodiment. In FIGS. 18 and 19, a light source 40 that emits light includes a light emitting device 1 and a light emitting device drive circuit 44 that drives the light emitting device 1 to emit light. The light source 40 emits light once or intermittently. A sensor 4 converts received reflected light into an electrical signal, and accumulates the electrical signal. A sensor drive circuit 5 drives the sensor 4 to accumulate a signal amount. A timing generation circuit 41 sends a drive timing signal to the light emitting device drive circuit 44 and the sensor drive circuit 5 to synchronize the light emission operation of the light source 40 with the signal accumulation operation of the sensor 4.

An analog front end (AFE) 7 converts an output of the sensor 4 into a digital signal. A calculation device 42 calculates a distance to an object using an output of the AFE 7. Here, if the sensor 4 includes an AD conversion device, the AFE 7 is not required. An adjustment circuit 8 adjusts, based on information output from the calculation device 42, a difference in drive timing between the light emitting device 1 and the sensor 4, the gain of an output of the sensor 4, etc. Note that the adjustment circuit 8 is provided in order to maintain the system in an optimum state, and therefore, is not necessarily essential. Also, a power supply device is additionally required, which is not shown because it is obvious.

A feedback circuit 43 changes drive timings of the light source 40 and the sensor 4 based on distance information obtained from the calculation device 42. The feedback circuit 43 sends a signal for controlling the waveform of light emitted by the light source 40, based on the distance information, to the light emitting device drive circuit 44, and a signal for adjusting a signal accumulation period of the sensor 4 to the timing generation circuit 41.

In the configuration of FIG. 18, the calculation device 42 stores a calculation expression indicating a relationship between a distance to an object and a sensor output. The calculation device 42 calculates a distance from the output of the sensor 4 using the calculation expression. In the configuration of FIG. 19, a storage device 11 is provided that stores a lookup table indicating a relationship between a distance to an object and a sensor output. The calculation device 42 calculates a distance by referencing the lookup table stored in the storage device 11.

In this embodiment, the light source 40 emits light having a waveform that has a peak intensity whose timing is adjustable, instead of a rectangular wave pulse, in order to provide an adjustable distance range that allows for improvement in the accuracy of distance measurement. Specifically, the emission intensity of the light source 40 is set to be higher at a predetermined timing than during the other period. In other words, a period of time during which the emission intensity of the light source 40 is set to be higher than during the other period, is adjusted, depending on a predetermined distance that provides an improved accuracy of distance measurement.

Here, as an example, it is assumed that the waveform of emitted light whose emission intensity is represented by a linear function is employed.

Figure 20:
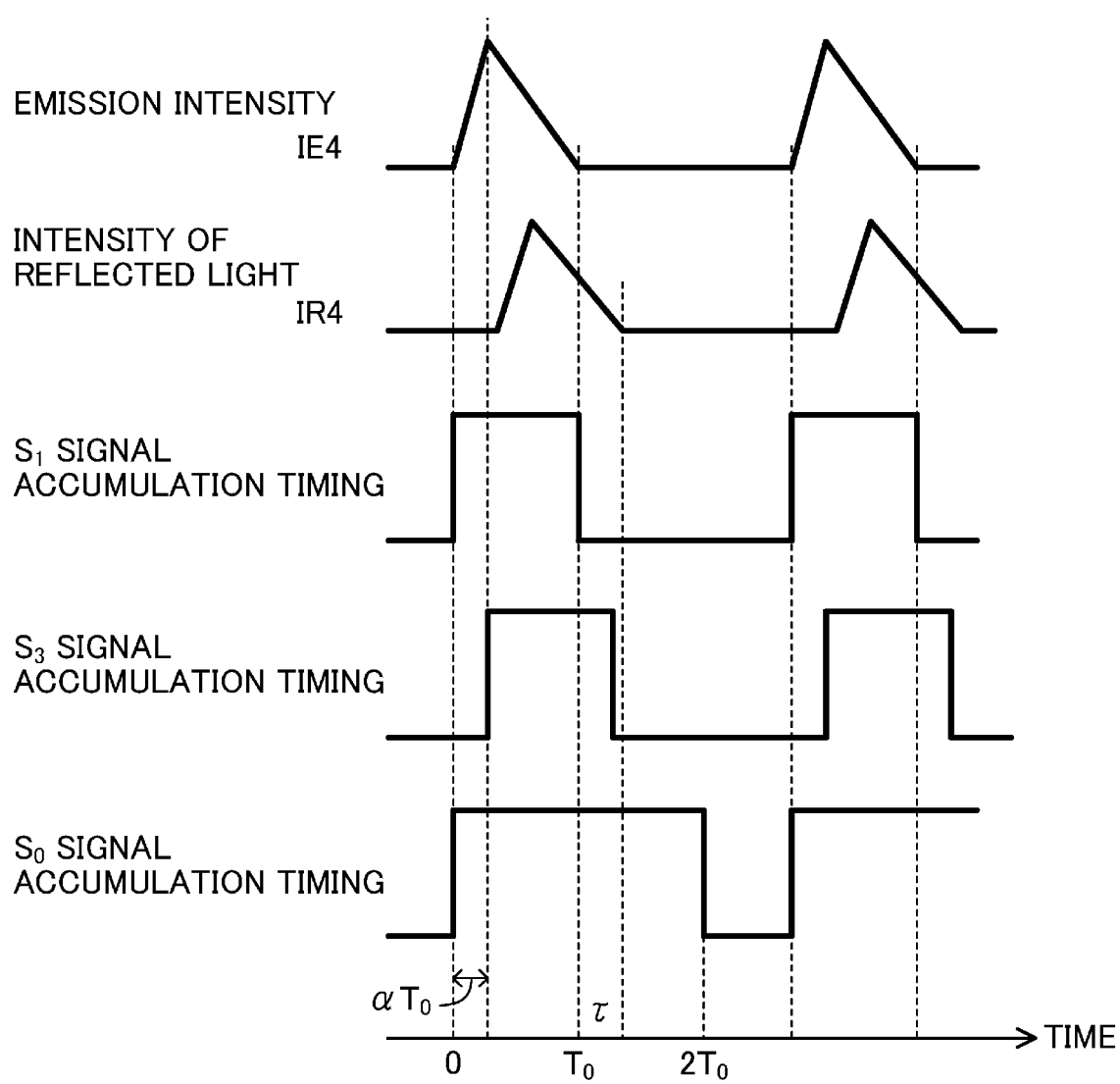
FIG. 20 is a timing chart showing an example waveform of light emitted by a light source, an example waveform of reflected light, and example timings of signal accumulation by a sensor, in the fourth embodiment.

FIG. 20 is a timing chart showing an example waveform of light emitted by the light source 40, an example waveform of reflected light, and example timings of signal accumulation by the sensor 4, according to this embodiment. In FIG. 20, the light source 40 emits light during an emission period of $0\text{-}T_0$, and the sensor 4 receives the reflected light. The waveform IR4 of the reflected light is delayed from the waveform IE4 of the emitted light by a time $\tau$.

The waveform IE4 of the emitted light may be represented by the following expression 63 using a constant $\alpha$ represented by the following expression 62:

$$0 \le \alpha \le 1 \tag{62}$$

$$I = \frac{t}{\alpha T_0} \quad (0 \le t \le \alpha T_0)$$

$$I = \frac{T_0 - t}{(1-\alpha)T_0} \quad (\alpha T \le t \le T_0)$$

$$I = 0 \quad (t \le 0, \ T_0 \le t) \tag{63}$$

where the amplitude of the waveform IE4 of the emitted light is normalized to one for the sake of simplicity.

The waveform IR4 of the reflected light may be represented by:

$$I' = r\frac{t-\tau}{\alpha T_0} \quad (\tau \le t \le \alpha T_0 + \tau) \tag{64}$$

$$I' = r\frac{T_0 + \tau - t}{(1-\alpha)T_0} \quad (\alpha T_0 + \tau \le t \le T_0 + \tau)$$

$$I' = 0 \quad (t \le \tau, \ T_0 + \tau \le t)$$

where r represents an attenuation rate due to reflection or diffusion of light.

The sensor 4 accumulates a plurality of signal amounts obtained by converting the reflected light into an electrical signal during respective accumulation periods that are different from each other in at least one of the start time and the end time. In the example of FIG. 20, the accumulation periods of signal amounts $S_0$ and $S_1$ are represented, respectively, by:

$S_0$: $0 \le t \le 2T_0$ $S_1$: $0 \le t \le T_0$ \hfill (65)

In this case, the delay $\tau$ due to reflection of the emitted light may be calculated from the signal amounts $S_0$ and $S_1$ accumulated by the sensor 4 by:

$$\tau = T_0\sqrt{(1-\alpha)\left(1-\frac{S_1}{S_0}\right)} \tag{66}$$

when $0 \le \tau \le (1-\alpha)T_0$ $$\tau = T_0\left(1 - \sqrt{\frac{\alpha S_1}{S_0}}\right)$$

when \hfill (67)

$(1-\alpha)T \le \tau \le T_0$

Therefore, if the light source 40 and the sensor 4 are located at approximately the same position, a distance D to an object is calculated from the detected signal amounts $S_0$ and $S_1$ by:

$$D = \frac{c\tau}{2} = \frac{cT_0}{2}\sqrt{(1-\alpha)\left(1-\frac{S_1}{S_0}\right)} \tag{68}$$

when $0 \le \tau \le (1-\alpha)T_0$ $$D = \frac{c\tau}{2} = \frac{cT_0}{2}\left(1 - \sqrt{\frac{\alpha S_1}{S_0}}\right)$$

when \hfill (69)

$(1-\alpha)T \le \tau \le T_0$ where $T_0$ represents the pulse width of the emitted light, and c represents the speed of light.

From the signal accumulation periods represented by Expression 65, the following is obtained:

$$0 \le S_1 \le S_0 \tag{70}$$

Therefore, the distance measurement range $D_0$ determined by light having the pulse width $T_0$ is represented by:

$$D_0 = \frac{cT_0}{2} \tag{71}$$

Therefore, Expressions 68 and 69 may also be represented by:

$$D = D_0\sqrt{(1-\alpha)\left(1-\frac{S_1}{S_0}\right)} \tag{72}$$

when $0 \le \tau \le (1-\alpha)T_0$ $$D = D_0\left(1 - \sqrt{\frac{\alpha S_1}{S_0}}\right)$$

when \hfill (73)

$(1-\alpha)T \le \tau \le T_0$

When an image sensor is used for the detection, signal amounts $S_0(x, y)$ and $S_1(x, y)$ corresponding to coordinates (x, y) of each pixel may be measured, and an object distance D(x, y) corresponding to each pixel may be calculated, as in Expressions 68 and 69, by:

$$D(x, y) = \tag{74}$$

$$\frac{cT_0}{2}\sqrt{(1-\alpha)\left(1-\frac{S_1(x, y)}{S_0(x, y)}\right)} = D_0\sqrt{(1-\alpha)\left(1-\frac{S_1(x, y)}{S_0(x, y)}\right)}$$

when $0 \le \tau \le (1-\alpha)T_0$ $$D(x, y) = \frac{cT_0}{2}\left(1 - \sqrt{\frac{\alpha S_1(x, y)}{S_0(x, y)}}\right) = D_0\left(1 - \sqrt{\frac{\alpha S_1(x, y)}{S_0(x, y)}}\right) \tag{75}$$

when $(1-\alpha)T \le \tau \le T_0$

Here, from the waveform of emitted light represented by Expression 63 and the timings of signal accumulation represented by Expression 65, it is obvious that the signal amount $S_0$ is constant independently of the distance to an object to be measured. Specifically, a relationship between $S_1/S_0$ and $D/D_0$ represents a relationship between the distance to an object to be measured and the accumulated signal amount.

Figure 21:
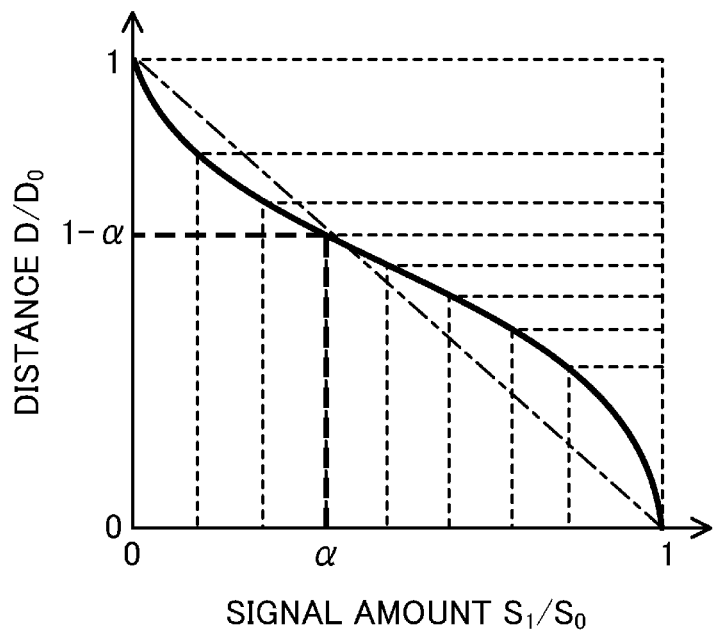
FIG. 21 is a graph showing a relationship between a distance to an object to be measured and a signal amount, that corresponds to FIG. 20.

FIG. 21 is a graph plotted based on Expressions 72 and 73 to show the relationship between $S_1/S_0$ and $D/D_0$. In FIG. 21, the vicinity of $S_1/S_0=1$ corresponds to the vicinity of $D/D_0=0$, i.e., a very short distance from the sensor 4 or the light source 40. The vicinity of $S_1/S_0=0$ corresponds to the vicinity of $D/D_0=1$, i.e., the vicinity of the upper limit of the distance measurement range that is a longest distance from the sensor 4 or the light source 10. Moreover, in the vicinity of $D/D_0=1-\alpha$, which corresponds to $S_1/S_0=\alpha$, the proportion of a change in $D/D_0$ to a change in $S_1/S_0$ is $-1/2$. Thus, the absolute value is 1/2 compared to the conventional change proportion of $-1$. This means that even if the measurement accuracy of the signal amount $S_1$ of the sensor 4, which is an observed amount, is the same as the conventional one, the distance measurement accuracy is twice as high as the conventional one.

In other words, the proportion of a change in the distance D to a change in the signal amount $S_1$ is smaller at a predetermined distance specified by the parameter $\alpha$ within the distance measurement range than in the other portion of the distance measurement range. This improves the distance measurement accuracy in the vicinity of the predetermined distance within the distance measurement range.

This embodiment described here is similar to the first embodiment when $\alpha=0$, the second embodiment when $\alpha=1$, and the third embodiment when $\alpha=1/2$. In other words, in this embodiment, the distance measurement accuracy can be improved for any distance ranging from a very short distance to the upper limit of the distance measurement range by changing the waveform of light emitted by the light source 40 using the parameter $\alpha$. In other words, if a main object to be measured is in the vicinity of a distance D corresponding to $D/D_0=1-\alpha$, the distance to the main object can be measured with highest accuracy by setting the waveform of light emitted by the light source 40 to have a peak corresponding to $\alpha$.

Moreover, as described in the above embodiments, the distance measurement accuracy can be further improved based on the signal amount measurement accuracy. For example, as shown by the signal amount $S_3$ of FIG. 20, the signal accumulation period may be changed, depending on the parameter $\alpha$, i.e., a predetermined distance within the distance measurement range at which the distance measurement accuracy should be improved. As a result, at a predetermined distance, the influence of shot noise can be minimized, and therefore, the distance measurement accuracy can be further improved.

Figure 22:
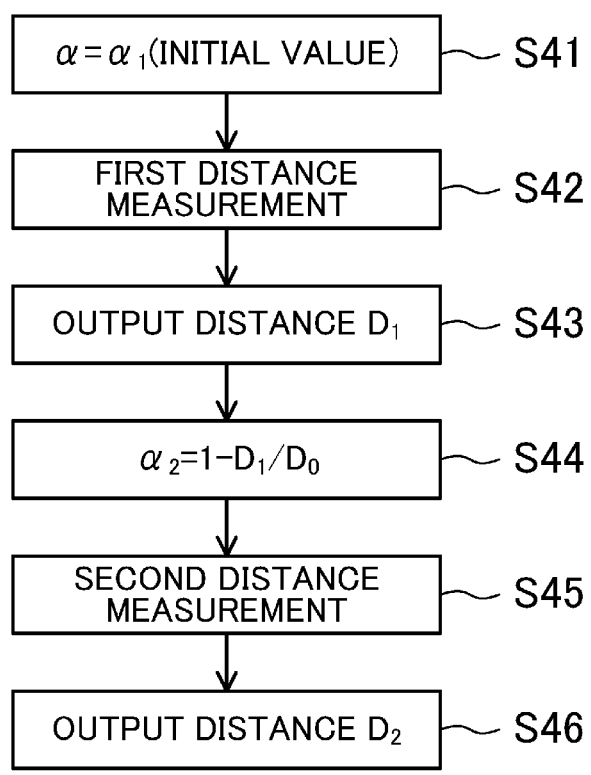
FIG. 22 is a diagram showing an example distance measuring algorithm in the fourth embodiment.

FIG. 22 shows an example distance measuring algorithm in this embodiment. In the algorithm, distance measurement is performed twice in order to improve the accuracy of measurement of a distance D to a main object to be measured.

Initially, the parameter $\alpha$ is set to an arbitrary initial value $\alpha_1$ (S41), and first distance measurement is performed using the above method (S42). It is assumed that, as a result, a distance $D_1$ of an object to be measured is obtained (S43). Next, the parameter $\alpha$ is set to $\alpha_2$ $(=1-D_1/D_0)$ (S44), and second distance measurement is performed using the above method (S45). As a result, a distance $D_2$ of the object to be measured is obtained (S46).

Thus, even if the distance D to a main object to be measured is unknown, distance measurement can be performed with a distance measurement accuracy that is highest in the vicinity of the distance D by performing distance measurement a plurality of times while changing one or both of the waveform of emitted light and the signal accumulation period using the parameter $\alpha$. Although, in FIG. 22, distance measurement is performed twice, the distance measurement accuracy of a distance to an object can be improved by performing distance measurement three times or more. For example, after step S46, third distance measurement may be performed using the parameter $\alpha$ that is set to $\alpha_3$ $(=1-D_2/D_0)$.

Figure 23:
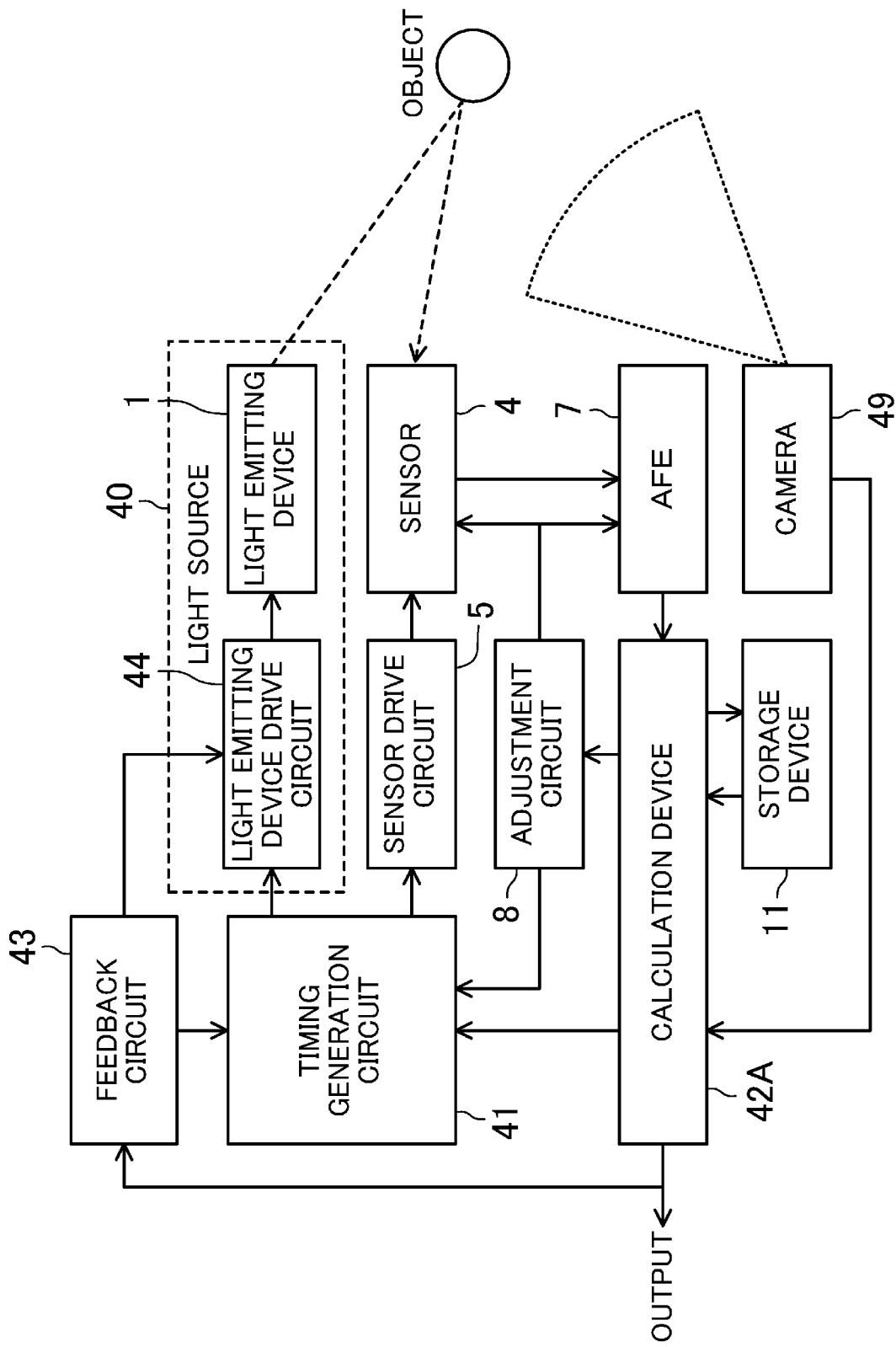
FIG. 23 is a block diagram showing still another example configuration of the TOF distance measuring system of the fourth embodiment.

FIG. 23 is a block diagram showing another example configuration of a TOF distance measuring system according to this embodiment. If the sensor 4 is a one-dimensional or two-dimensional image sensor, a plurality of pieces of distance data corresponding to coordinate points (x, y) are measured as a distance image according to Expressions 74 and 75. Therefore, in FIG. 23, a camera 49 is provided in order to specify a main object to be measured in a distance image. A calculation device 42A specifies the coordinates of a main object to be measured in a distance image, based on an image output by the camera 49, and adjusts the waveform of emitted light so that the waveform is suited to the distance D to the object to be measured. Although, in FIG. 23, the camera 49 is provided separately from the sensor 4, the sensor 4 may have both the distance measurement function and the normal image capture function.

Figure 24:
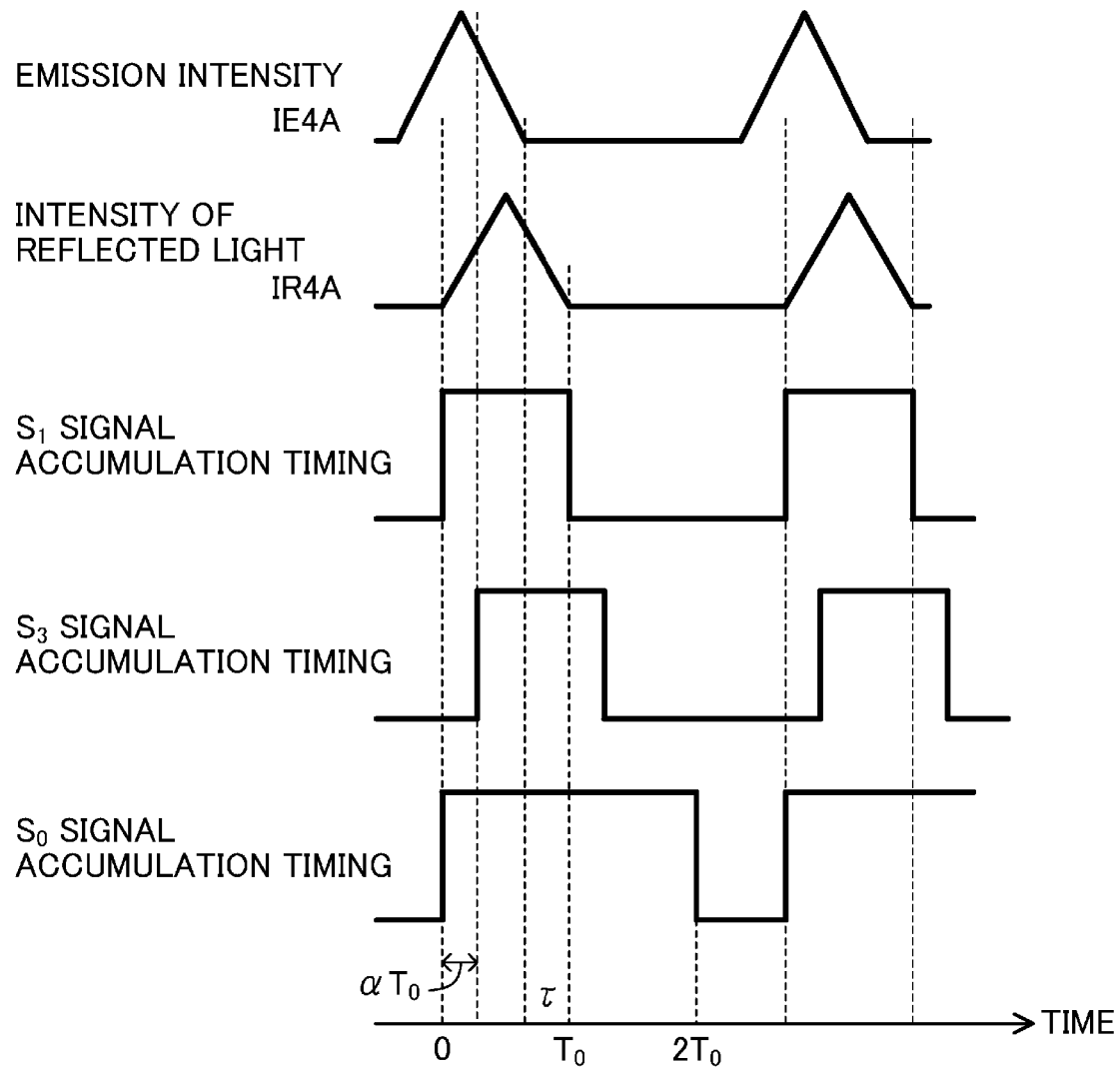
FIG. 24 is a timing chart showing another example waveform of light emitted by a light source, another example waveform of reflected light, and another example set of timings of signal accumulation by a sensor, in the fourth embodiment.
Figure 25:
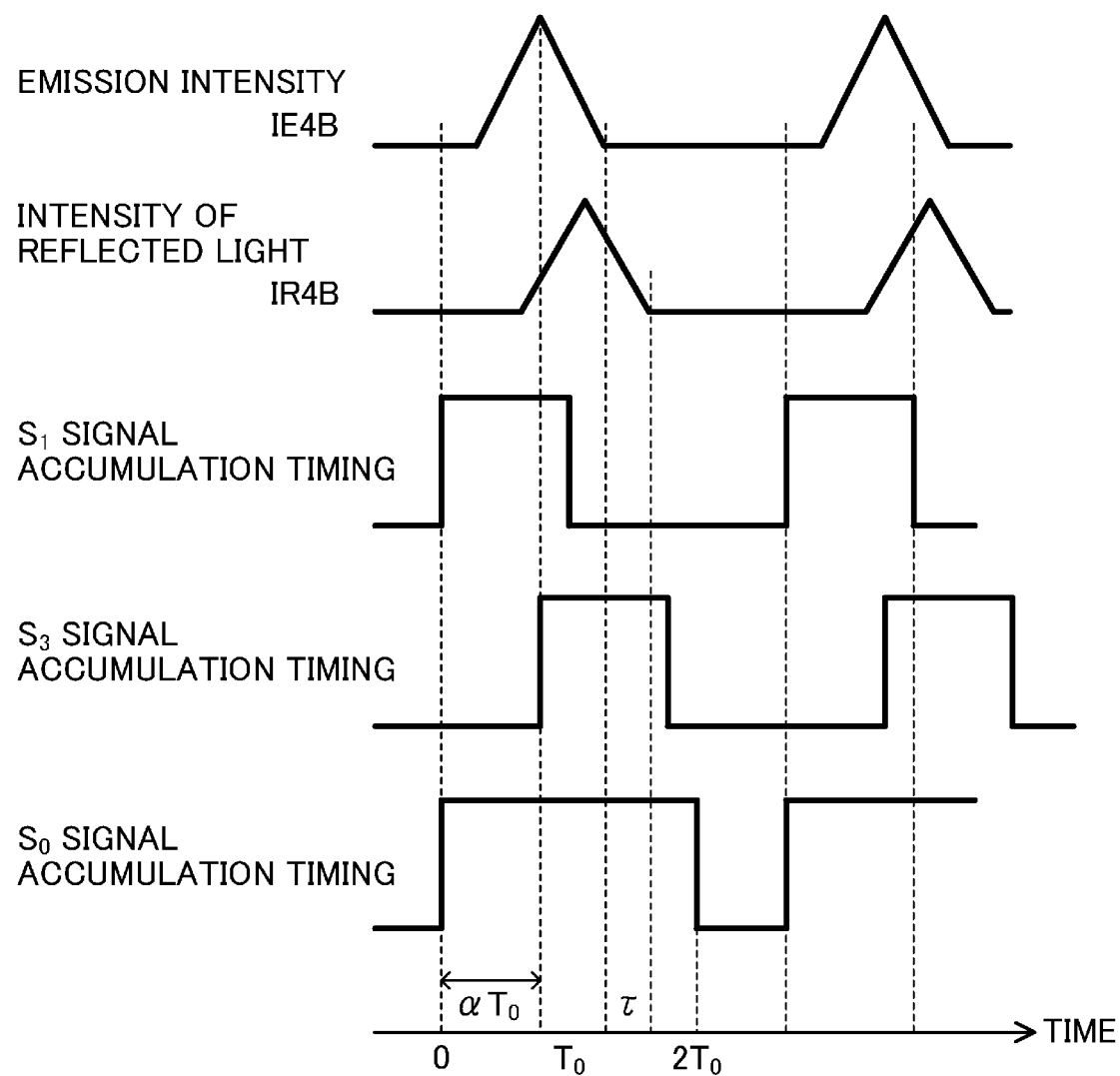
FIG. 25 is a timing chart showing still another example waveform of light emitted by a light source, still another example waveform of reflected light, and another example set of timings of signal accumulation by a sensor, in the fourth embodiment.
Figure 26:
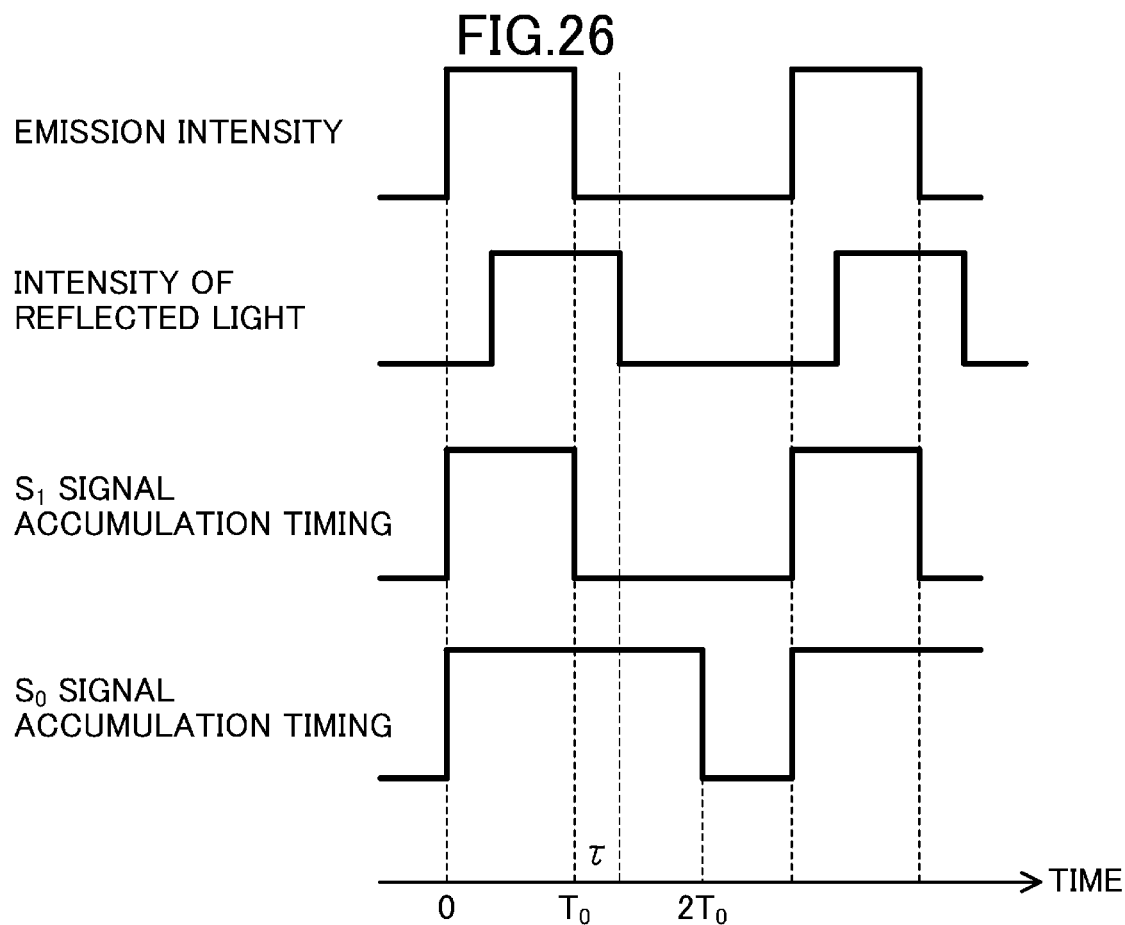
FIG. 26 is a timing chart showing an example waveform of light emitted by a light source, an example waveform of reflected light, and example timings of signal accumulation by a sensor, in the conventional art.
Figure 27:
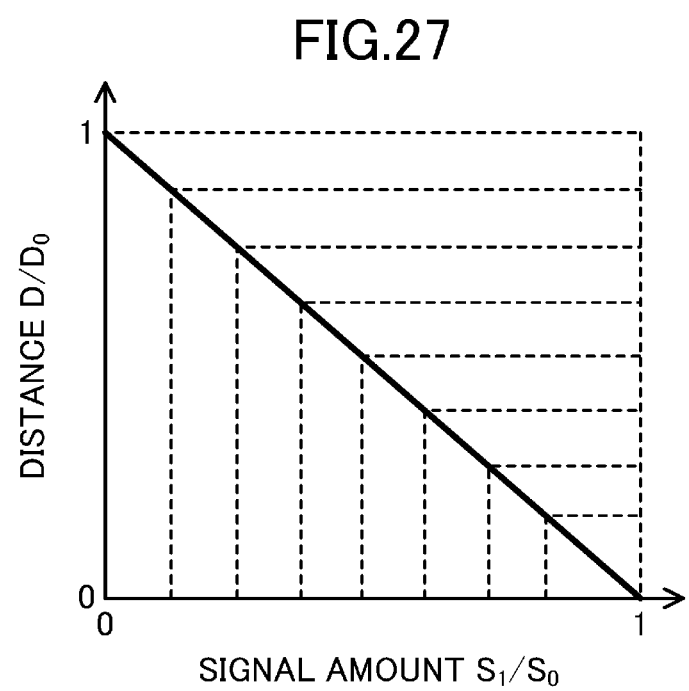
FIG. 27 is a graph showing a relationship between a distance to an object to be measured and a signal amount, that corresponds to FIG. 26.

Note that, in the foregoing, it is assumed that the parameter $\alpha$ is used to change the slopes of the rise and fall of the waveform of light emitted by the light source 40. If such an adjustment of the waveform of emitted light is practically difficult, the start time of the signal accumulation period of the sensor 4 may be advanced or delayed while the waveform of light emitted by the light source 40 is kept unchanged, as shown in FIGS. 24 and 25, for example. In this case, the time the emission intensity of the light source 40 reaches a peak can also be advanced or delayed relative to the timing of signal accumulation, and therefore, a similar effect is obtained.

In the foregoing, the waveform of emitted light whose emission intensity is represented by a linear function is described as an example for the sake of simplicity of calculation. Any waveform in which the emission intensity has a peak in the vicinity of time $\alpha T_0$, may, of course, be used to obtain a similar effect. Such a waveform may include those approximated by a higher-order polynomial, irrational function, exponential function, etc. Alternatively, a waveform of emitted light whose emission intensity may have a rise and a fall that are represented by different functions, may be used.

In this embodiment, as in the above embodiments, if the calculation device 42 includes a calculation expression representing a relationship between a signal amount and a distance that corresponds to the waveform of emitted light, a distance measuring system that achieves the distance measuring method of this embodiment can be provided. Note that this embodiment is different from the above embodiments in that the feedback circuit 43 is provided to adjust the waveform of emitted light so that the waveform is suited to the result of distance measurement. If the sensor is a one-dimensional or two-dimensional image sensor, the calculation device 42 may specify a main object in a distance measurement image, and output a distance to the main object to the feedback circuit 43.

Also, if it is practically difficult to analytically calculate a relationship between a distance and a signal amount from the waveform of emitted light, or it is difficult to approximate the waveform of emitted light using a function, a correlation shown in FIG. 21 may be obtained by actual measurement. The thus-obtained lookup table between a signal amount and a distance may be stored in the storage device 11. By incorporating the storage device 11 into a distance measuring system, the distance measuring system can achieve the distance measuring method of this embodiment. Specifically, the calculation device 42 references the lookup table stored in the storage device 11 using a signal amount obtained from the sensor 4 to output distance information. Based on the distance information, the feedback circuit 43 changes the waveform of emitted light, so that distance measurement can be performed again.

According to the present disclosure, in a TOF distance measuring system, the accuracy of distance measurement can be improved without a significant increase in cost, which is effective in increasing the accuracy of, and decreasing the cost of, a distance measuring sensor, for example.

What is claimed is:

1. In a time-of-flight (TOF) distance measuring system including a light source for emitting light, a sensor for operating in synchronization with the light source to convert received reflected light into an electrical signal and accumulate the electrical signal, and a calculation device, a method for measuring a distance to an object comprising:
emitting light to the object during a predetermined emission period using the light source;
accumulating signal amounts during a plurality of signal accumulation periods different from each other in at least one of a start time and an end time in the sensor; and
calculating the distance to the object based on the signal amounts accumulated in the plurality of signal accumulation periods using the calculation device,
wherein
a first signal accumulation period that is at least one of the plurality of signal accumulation periods is set so that a first accumulated signal amount that is a signal amount accumulated during the first signal accumulation period varies depending on the distance to the object,
emission intensity of the light source during the emission period is changed so that the first accumulated signal amount and the distance to the object have a nonlinear relationship within a distance measurement range, and
the emission intensity of the light source is higher during an initial portion of the emission period than during the other portion of the emission period so that the proportion of a change in the distance to the object to a change in the first accumulated signal amount is smaller in the vicinity of an upper limit of the distance measurement range than in the other portion of the distance measurement range.

2. The method of claim 1, wherein the first signal accumulation period is set so that the first accumulated signal amount is maximized when the object is located in the vicinity of the upper limit of the distance measurement range.

3. In a time-of-flight (TOF) distance measuring system including a light source for emitting light, a sensor for operating in synchronization with the light source to convert received reflected light into an electrical signal and accumulate the electrical signal, and a calculation device, a method for measuring a distance to an object comprising:
emitting light to the object during a predetermined emission period using the light source;
accumulating signal amounts during a plurality of signal accumulation periods different from each other in at least one of a start time and an end time in the sensor; and
calculating the distance to the object based on the signal amounts accumulated in the plurality of signal accumulation periods using the calculation device,
wherein
a first signal accumulation period that is at least one of the plurality of signal accumulation periods is set so that a first accumulated signal amount that is a signal amount accumulated during the first signal accumulation period varies depending on the distance to the object,
emission intensity of the light source during the emission period is changed so that the first accumulated signal amount and the distance to the object have a nonlinear relationship within a distance measurement range, and
the emission intensity of the light source is higher during an end portion of the emission period than during the other portion of the emission period so that the proportion of a change in the distance to the object to a change in the first accumulated signal amount is smaller in the vicinity of a lower limit of the distance measurement range than in the other portion of the distance measurement range.

4. The method of claim 3, wherein the first signal accumulation period is set so that the first accumulated signal amount is maximized when the object is located in the vicinity of the lower limit of the distance measurement range.

5. The method of claim 1, wherein the emission intensity of the light source is higher during a middle portion of the emission period than during the other portion of the emission period so that the proportion of a change in the distance to the object to a change in the first accumulated signal amount is smaller in the vicinity of a middle of the distance measurement range than in the other portion of the distance measurement range.

6. The method of claim 5, wherein the first signal accumulation period is set so that the first accumulated signal amount is maximized when the object is located in the vicinity of the middle of the distance measurement range.

7. The method of claim 1, wherein
the distance measuring system has a camera, or the sensor has a camera function, and
the calculation device specifies a main object to be measured, based on an image captured by the camera or the sensor.

8. In a time-of-flight (TOF) distance measuring system including a light source for emitting light, a sensor for operating in synchronization with the light source to convert received reflected light into an electrical signal and accumulate the electrical signal, and a calculation device, a method for measuring a distance to an object comprising:
emitting light to the object during a predetermined emission period using the light source;
accumulating signal amounts during a plurality of signal accumulation periods different from each other in at least one of a start time and an end time in the sensor; and
calculating the distance to the object based on the signal amounts accumulated in the plurality of signal accumulation periods using the calculation device, wherein
a first signal accumulation period that is at least one of the plurality of signal accumulation periods is set so that a first accumulated signal amount that is a signal amount accumulated during the first signal accumulation period varies depending on the distance to the object,
emission intensity of the light source during the emission period is changed so that the first accumulated signal amount and the distance to the object have a nonlinear relationship within a distance measurement range, and
a portion of the emission period during which the emission intensity of the light source is higher than during the other portion of the emission period, is adjusted, depending on a predetermined distance within the distance measurement range, so that the proportion of a change in the distance to the object to a change in the first accumulated signal amount is smaller at the predetermined distance within the distance measurement range than in the other portion of the distance measurement range.

9. The method of claim 8, wherein the first signal accumulation period is adjusted, depending on the predetermined distance, so that the first accumulated signal amount is maximized when the object is located at the predetermined distance within the distance measurement range.

10. The method of claim 8, wherein
a first distance to the object is calculated by performing first distance measurement where the predetermined distance is set as an initial value,
a portion of the emission period during which the emission intensity of the light source is higher than during the other portion of the emission period, is adjusted, depending on the first distance, so that the proportion of a change in the distance to the object to a change in the first accumulated signal amount is smaller at the calculated first distance than in the other portion of the distance measurement range, and
a second distance to the object is obtained by performing second distance measurement using the adjusted emission intensity.

11. The method of claim 10, wherein the first signal accumulation period is adjusted, depending on the first distance, before the second distance measurement is performed, so that the first accumulated signal amount is maximized at the first distance within the distance measurement range.

12. A time-of-flight (TOF) distance measuring system comprising:
a light source configured to emit light during a predetermined emission period, the light source including a light emitting device, and a light emitting device drive circuit configured to drive the light emitting device;
a sensor configured to convert received reflected light into an electrical signal, and accumulate the electrical signal;
a sensor drive circuit configured to operate the sensor so that the sensor accumulates signal amounts during a plurality of signal accumulation periods different from each other in at least one of a start time and an end time;
a timing generation circuit configured to send a drive timing signal to the light emitting device drive circuit and the sensor drive circuit so that the emission operation of the light source and the signal accumulation operation of the sensor are synchronized with each other; and
a calculation device configured to calculate a distance to an object based on the signal amounts accumulated during the plurality of signal accumulation periods in the sensor,
wherein
a first signal accumulation period that is at least one of the plurality of signal accumulation periods is set so that a first accumulated signal amount that is a signal amount accumulated during the first signal accumulation period varies depending on the distance to the object,
the light emitting device drive circuit changes emission intensity of the light source during the emission period,
the calculation device calculates the distance to the object based on a nonlinear relationship between the first accumulated signal amount and the distance to the object, within the distance measurement range, and
the emission intensity of the light source is higher during an initial portion of the emission period than during the other portion of the emission period so that the proportion of a change in the distance to the object to a change in the first accumulated signal amount is smaller in the vicinity of an upper limit of the distance measurement range than in the other portion of the distance measurement range.

13. The distance measuring system of claim 12, wherein the calculation device stores a calculation expression representing the nonlinear relationship between the first accumulated signal amount and the distance to the object, and calculates the distance to the object using the calculation expression.

14. The distance measuring system of claim 12, further comprising:
a storage device configured to a lookup table indicating the nonlinear relationship between the first accumulated signal amount and the distance to the object,
wherein the calculation device performs calculation using the lookup table stored in the storage device.

15. The distance measuring system of claim 12, wherein the distance measuring system includes a camera, or the sensor has a camera function, and
the calculation device specifies a main object to be measured, based on an image captured by the camera or the sensor.

16. A time-of-flight (TOF) distance measuring system comprising:
a light source configured to emit light during a predetermined emission period, the light source including a light emitting device, and a light emitting device drive circuit configured to drive the light emitting device;
a sensor configured to convert received reflected light into an electrical signal, and accumulate the electrical signal;
a sensor drive circuit configured to operate the sensor so that the sensor accumulates signal amounts during a plurality of signal accumulation periods different from each other in at least one of a start time and an end time;
a timing generation circuit configured to send a drive timing signal to the light emitting device drive circuit and the sensor drive circuit so that the emission operation of the light source and the signal accumulation operation of the sensor are synchronized with each other;
a calculation device configured to calculate a distance to an object based on the signal amounts accumulated during the plurality of signal accumulation periods in the sensor, and a feedback circuit configured to send a signal for controlling a waveform of light emitted by the light source, based on distance information output from the calculation device, to the light emitting device drive circuit, wherein a first signal accumulation period that is at least one of the plurality of signal accumulation periods is set so that a first accumulated signal amount that is a signal amount accumulated during the first signal accumulation period varies depending on the distance to the object, the light emitting device drive circuit changes emission intensity of the light source during the emission period, the calculation device calculates the distance to the object based on a nonlinear relationship between the first accumulated signal amount and the distance to the object, within the distance measurement range.

17. The distance measuring system of claim 16, wherein the feedback circuit sends a signal for adjusting the first signal accumulation period, based on the distance information out from the calculation device, to the timing generation circuit.

* * * * *